United States Patent
Forutanpour et al.

(10) Patent No.: US 8,390,583 B2
(45) Date of Patent: Mar. 5, 2013

(54) PRESSURE SENSITIVE USER INTERFACE FOR MOBILE DEVICES

(75) Inventors: Babak Forutanpour, Carlsbad, CA (US); Salman Saeed, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 12/551,543

(22) Filed: Aug. 31, 2009

(65) Prior Publication Data

US 2011/0050576 A1    Mar. 3, 2011

(51) Int. Cl.
G06F 3/041    (2006.01)
(52) U.S. Cl. .................................... 345/173; 345/168
(58) Field of Classification Search .................. None
See application file for complete search history.

(56) References Cited

U.S. PATENT DOCUMENTS

| | | |
|---|---|---|
| 2003/0048260 A1 | 3/2003 | Matusis |
| 2006/0244727 A1 | 11/2006 | Salman et al. |
| 2008/0297475 A1 | 12/2008 | Woolf et al. |
| 2009/0027353 A1 | 1/2009 | Im et al. |
| 2010/0103127 A1* | 4/2010 | Park et al. .............. 345/173 |

FOREIGN PATENT DOCUMENTS

WO    WO 2007016704 A2 *    2/2007

OTHER PUBLICATIONS

International Search Report—PCT/US2010/044641—ISA—EPO—Oct. 29, 2010.

* cited by examiner

*Primary Examiner* — Adam R Giesy
(74) *Attorney, Agent, or Firm* — James T. Hagler

(57) ABSTRACT

Virtual keypads are provided which determine an intended user key entry based upon location of keystrokes as well as other keystroke characteristics such as keystroke shape and/or pressure. Virtual keypad layouts which include overlapping or multi-character keys may be used to reduce typing errors on small pressure sensing touch screens. Keystrokes on overlapping or multi-character keys may be disambiguated using measured pressures applied to the pressure sensing touch screen as well as other keystroke characteristics such as keystroke shape. Additional user interfaces are provided which exploit pressure sensing touch screen capable of discriminating magnitudes of pressure exerted upon the touch screen surface.

20 Claims, 23 Drawing Sheets

| Contact Function | Pressure |
|---|---|
| Voice Call | 1 Newton < X < 10 Newtons |
| Email | 10 Newtons < X < 20 Newtons |
| SMS | 20 Newtons < X < 30 Newtons |
| Voice Call to Work | 30 Newtons < X |

FIG. 22

| Degree of Zoom | Pressure |
|---|---|
| 1.5x | 1 Newton < X < 10 Newtons |
| 2x | 10 Newtons < X < 20 Newtons |
| 5x | 20 Newtons < X < 30 Newtons |
| 10x | 30 Newtons < X |

FIG. 23

PRESSURE SENSITIVE USER INTERFACE FOR MOBILE DEVICES

FIELD OF THE INVENTION

The present invention relates generally to computer user input devices, and more particularly to pressure sensitive mobile device user interfaces.

BACKGROUND

The demand for computing devices that are powerful yet portable, compact yet fully featured is ever increasing. This trend is particularly evident in the evolution of mobile electronic devices (mobile devices), such as cellular telephones, that now function as telephones, video and audio capture devices, video and audio players, web access terminals, and computers.

As mobile devices grow in sophistication, the variety and sophistication of application software is increasing, thereby turning mobile devices into multipurpose productivity tools. Yet, the usefulness of mobile devices and their applications are limited by the small area available for the user-interface. Traditional cellular telephones, for example, include a simple keypad of fixed configuration. Recently, mobile devices have been released featuring miniature QWERTY keyboards, touch sensitive screen interfaces, and reconfigurable keys.

Traditionally, keypads function by transforming the depression of a physical key into an electrical signal that can be interpreted by the mobile device and its application software. FIG. 1 illustrates a hardware/software architecture of a typical mobile device showing one way that key press events may be communicated to application software. The pressing of a key on a traditional fixed keypad 5 closes a circuit or changes a capacitance or resistance that results in an electrical signal that can be processed by a hardware driver 4. The hardware driver 4 may be circuitry, software or a mixture of hardware and software depending upon the particular mobile device. The hardware driver 4 converts the electrical signal received from the keypad 5 into a format that can be interpreted by a software application running on the mobile device. This signal may be in the form of an interrupt or stored value in a memory table which is accessible by application software. Such an interrupt or stored value in memory may be received by a runtime environment software layer 3. The purpose of the runtime environment software layer 3 is to provide a common interface between application software and the mobile device. Thus, key press event signals are passed on to the application layer 2 in the form of a key press event message. The application software must be able to understand the meaning of the key press event, and therefore must be written to accommodate the underlying hardware driver 4 and keypad hardware 5. Key press events may also be communicated to a user-interface layer 1 such as to display the value associated with a particular key.

Virtual keypads (i.e., software generated keypads on a touch sensitive display surface) provide mobile device designers with increased design flexibility and freedom. By multi-tasking the touch sensitive display surface to act as a keypad only when needed, the mobile device may provide the user with a larger display surface when a keypad is not needed. However, virtual keypads continue to use a traditional approach. That is, virtual keypads typically mimic the function and layout design of traditional keypads.

SUMMARY

Various embodiment systems and methods make use of pressure sensitive displays to provide alternative virtual keypads that may improve user data entry throughput and reduce data entry errors. In an embodiment virtual keypad the images of keys traditionally displayed as individual keys are combined to form a combined key. Keystrokes to the combined key may represent a user's intention to enter any of the combined individual keys. Since the combined virtual key can be displayed much larger in size than would be the case if individual keys were presented, the user is less likely to erroneously strike an unintended key. A pressure sensor that can distinguish between varying levels of pressure is used to distinguish which of the individual keys the user intended. By striking the combined key with varying levels of pressure, users may communicate their intended key to the mobile device. Thus, the user's intended key may be determined by correlating both the location of the user's keystroke as well as the pressure in which the user executes the keystroke.

In another embodiment individual key images in a virtual keypad layout may be arranged such that some keys overlap others. Various embodiments utilize a combination of location, shape and/or pressure measurements to distinguish a user's intended keypad entry. In an embodiment, the mobile device may measure the position of the user's fingertips in a baseline resting position and disambiguates a keystroke to an overlapped key image by determining which hand made the keystroke. In another embodiment, the mobile device may record a user's keystroke signature in terms of touch shape and pressure on overlapped key images, and use this data to disambiguate a keystroke to an overlapped key image.

Pressure measuring capabilities of a mobile device display may be used in conjunction with other applications to initiate a function. In an embodiment, a mobile device may be configured to measure an amount of pressure in a keystroke within a display of a contacts application to display different contact functions (e.g., voice call, email, SMS, etc.) associated with a user's various contact records. In another embodiment, a mobile device may be configured to measure an amount of pressure exerted upon a touch sensitive display surface and adjust hardware control settings accordingly. For example, a mobile device may be configured to increase the volume output of the speaker in response to measuring the pressure applied to the touch screen pressed against the user's ear during a voice. In another embodiment, a mobile device may be configured to measure an amount of pressure exerted upon the touch sensitive display surface during a zoom in/out two-finger pinch touch/movement and adjust the degree of magnification (zoom) accordingly.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIG. 22 is a data structure of a pressure data table suitable for use in a speed dial function embodiment.

FIG. 23 is a data structure of a pressure data table suitable for use in an image zoom function embodiment.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 24:
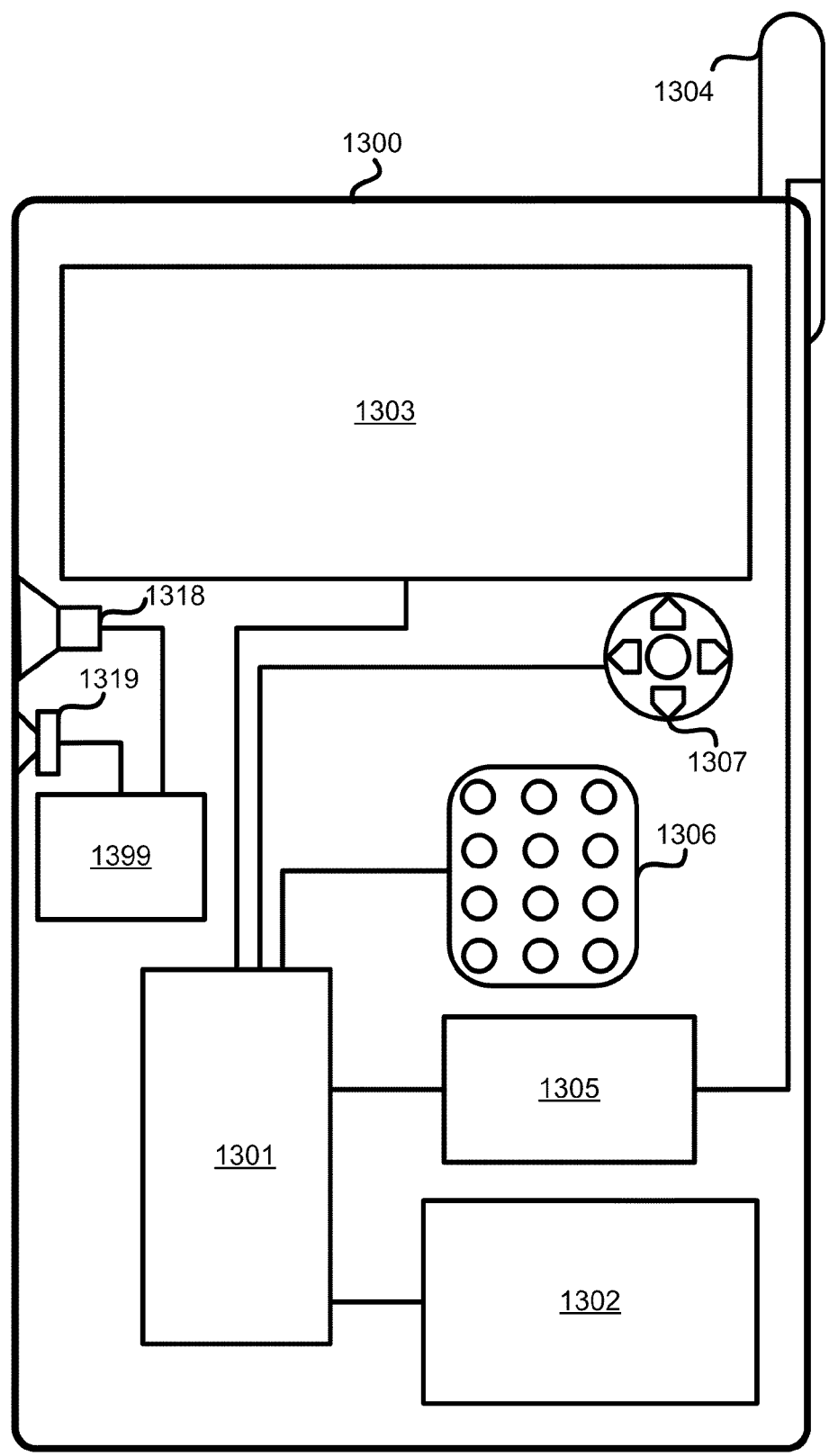
FIG. 24 is a component block diagram illustrating example components of a mobile device suitable for use in the various embodiments.

As used herein, the terms "mobile handsets" and "mobile devices" are used interchangeably and refer to any one of various cellular telephones, personal data assistants (PDA's), palm-top computers, laptop computers, wireless electronic mail receivers (e.g., the Blackberry® and Treo® devices), and multimedia Internet enabled cellular telephones (e.g., the Blackberry Storm®), and similar personal electronic devices. A mobile device may include a programmable processor and memory as described more fully below with reference to FIG. 24.

As used herein, the terms "keypad" and "keyboard" are used interchangeably to refer generally to any one of various configurations of user input devices used to convey input data to a computing device, such as a QWERTY (or other) keyboard, a number pad, a game controller, and a musical keyboard. Since the various aspects involve "virtual" user input devices whose "keys" may be displayed, the terms "keypad" and "keyboard" are not intended to require physical keys that can be depressed, but rather refer to any user input device which can sense a touch (or press) by a user finger and interpret that touch as a input to the computing device.

A used herein, the term "touch sensitive surface" encompasses any surface configured to detect or sense a touch (or press) by a user finger and interpret that touch as an input to the computing device. In particular, a touch sensitive surface can determine the location and/or shape of the touch of a user's finger tip. Sensing the touch location and/or shape of a fingertip on a surface can be accomplished using any of a variety of known technologies. For example, touch sensitive surfaces may include pressure sensing surfaces, capacitance-sensing surfaces, and induction-sensing services which directly detect a user's touch. Another example touch sensor may use sound or vibration measurements to detect and determine the location of a user touch, such as an ultrasound sensor that can detect a touch based upon the effect of ultrasound traveling through the cover glass, or sound or vibration sensors that can determine the location of a touch based upon triangulation of received vibration or sound from the touch on the cover glass.

A touch sensitive surface may be employed on any of a variety of surfaces, and thus is not intended to be limited to a particular type of device or form. As used herein, a "touch sensitive screen" or "touchscreen" is a touch sensitive surface in combination with a display. The display may be a physical display, such as a liquid crystal display (as in the Blackberry Storm®).

As used herein, the terms "virtual keypad" and "virtual keyboard" refer to a keypad image that is displayed on a touch sensitive surface, such as a touch screen. A virtual keypad is not necessarily limited to numbers or letters, and as used herein encompasses any user interface involving a user activation of a key or button. Examples of non-number and non-letter virtual keypads include game controllers, device controllers (e.g., a TV remote), application interfaces, and joy sticks including a touch sensitive surface. For example, a virtual keypad may be implemented as the user interface for an MP3 or video player application.

As used herein, the term "keypad layout data" refers collectively to information regarding the location, size, shape, and orientation of keys in a virtual keypad, particularly information that can be used to generate an image of the virtual keypad.

Figure 1:
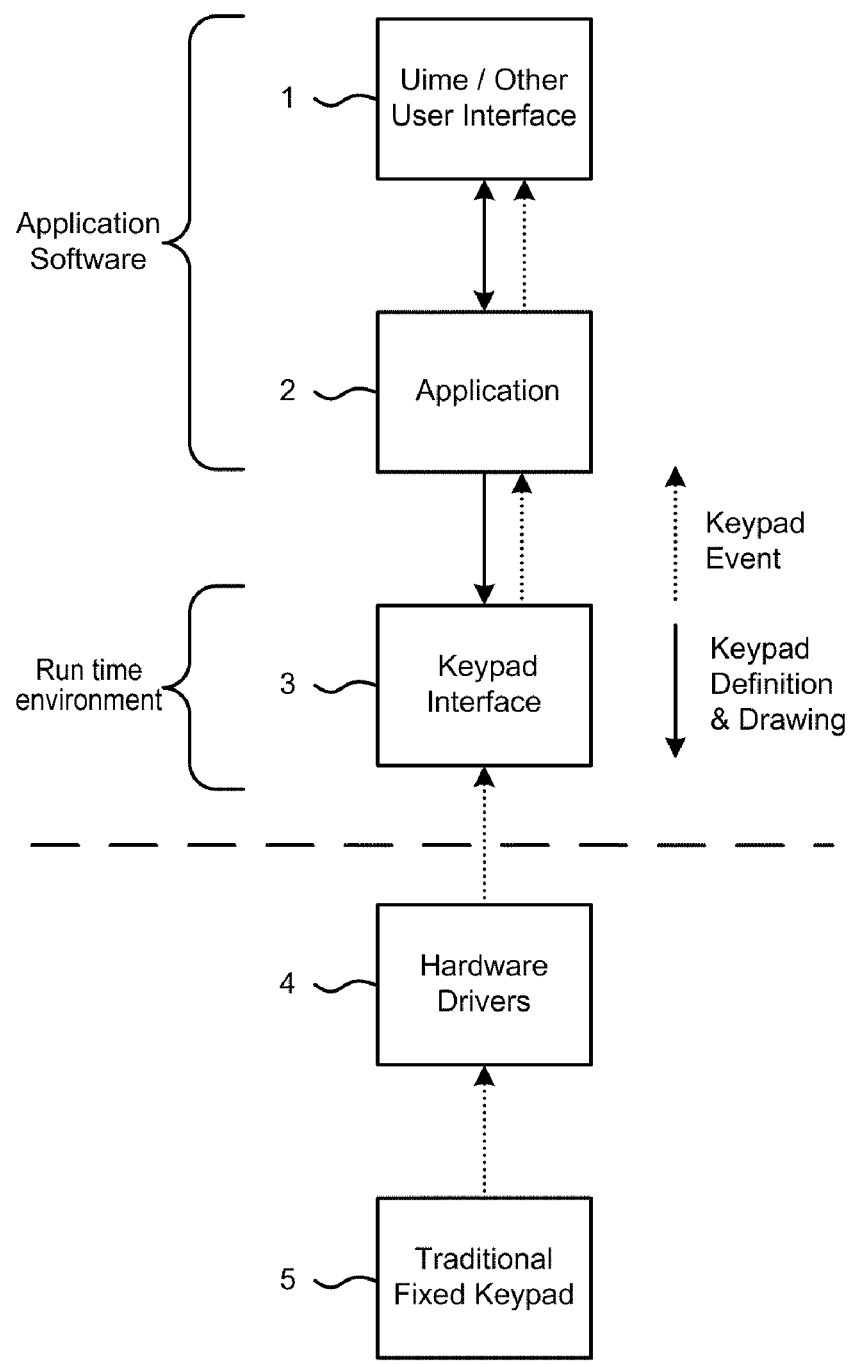
FIG. 1 is a hardware/software architecture diagram of a prior art mobile device.

As mobile devices become increasingly powerful computing platforms, users seek to obtain a desktop experience on their mobile devices. To satisfy these users, many mobile devices provide users with full alphanumeric QWERTY style keypads for data entry, as opposed to simpler 12 key (0-9, * and #) keypads. An illustrative hardware/software interface of a computing device keypad is illustrated in FIG. 1. The pressing of a key on the keypad 5 results in an electrical signal that can be processed by a hardware driver 4. The hardware driver 4 may be circuitry, software or a mixture of hardware and software depending upon the particular computing device (e.g., a mobile device). The hardware driver 4 converts the electrical signal received from the keypad 5 into a format that can be interpreted by a software application 2 running on the computing device. This signal may be in the form of an interrupt or stored value in a memory table which is accessible by the application 2. Such an interrupt or stored value in memory may be received by a keypad interface 3 that may be part of the runtime environment or operating system. The purpose of the keypad interface 3 is to provide a common interface between application software 2 and the computing device keypad 5. Thus, key press event signals may be passed on to the application layer 2 in the form of standard key press event signals or messages (e.g., ASCI character values) which the application 2 can interpret.

Using previously known system/hardware architectures such as illustrated in FIG. 1, application developers have had to adapt their software to operate with a "standard" keypad layout (for example, a QWERTY keyboard or number pad) or a keypad layout unique to each type of mobile device on which the application might be loaded. An application that requires a particular key set (for example a game or a device remote control), may not be operable on devices that have a fixed keypad layout or may be operable in a limited or user-unfriendly way. Systems and methods for providing a keypad protocol as a standard interface between application software and keypads, and other user-interfaces were recently disclosed in commonly owned U.S. patent application Ser. No. 12/139,823, entitled "Standardized Method and Systems for Providing Configurable Keypads" filed on Jun. 16, 2008, the entire contents of which are hereby incorporated herein by reference for all purposes.

While there is no explicit dimensional limit on mobile device, users may avoid mobile devices that do not fit easily into the user's pocket. Accordingly, mobile device designers often seek to incorporate as many features into a pocket sized device. One of the drawbacks of providing mobile devices with a full QWERTY style keyboard is the amount device real estate that is consumed by the keyboard. In order to facilitate a full QWERT keyboard, the display size must be reduced in order to maintain the pocket sized dimensions of the mobile device.

With the advent of touch screen technology, some mobile devices have been equipped with virtual keyboards. Rather than dedicating a portion of the mobile device surface to a physical keyboard, the virtual keyboard is displayed on the touch screen only when needed. By displaying the virtual keyboard on a larger touch screen display (made possible by the removal of the physical keyboard) each key image may be made larger in size than previously available by the physical keyboards. Nevertheless, users often complain that without the tactile feedback that delineates the individual keys on the keypad coupled with the small size of individual keys, keystrokes errors are common. Keystroke errors may occur when users attempt to strike one key, but the mobile device senses a strike of an adjacent key. In order to overcome such problems, the various embodiments present alternative virtual keyboard layouts coupled with pressure measurements or keystroke dimensional analysis to improve user data entry throughput.

Figure 2:
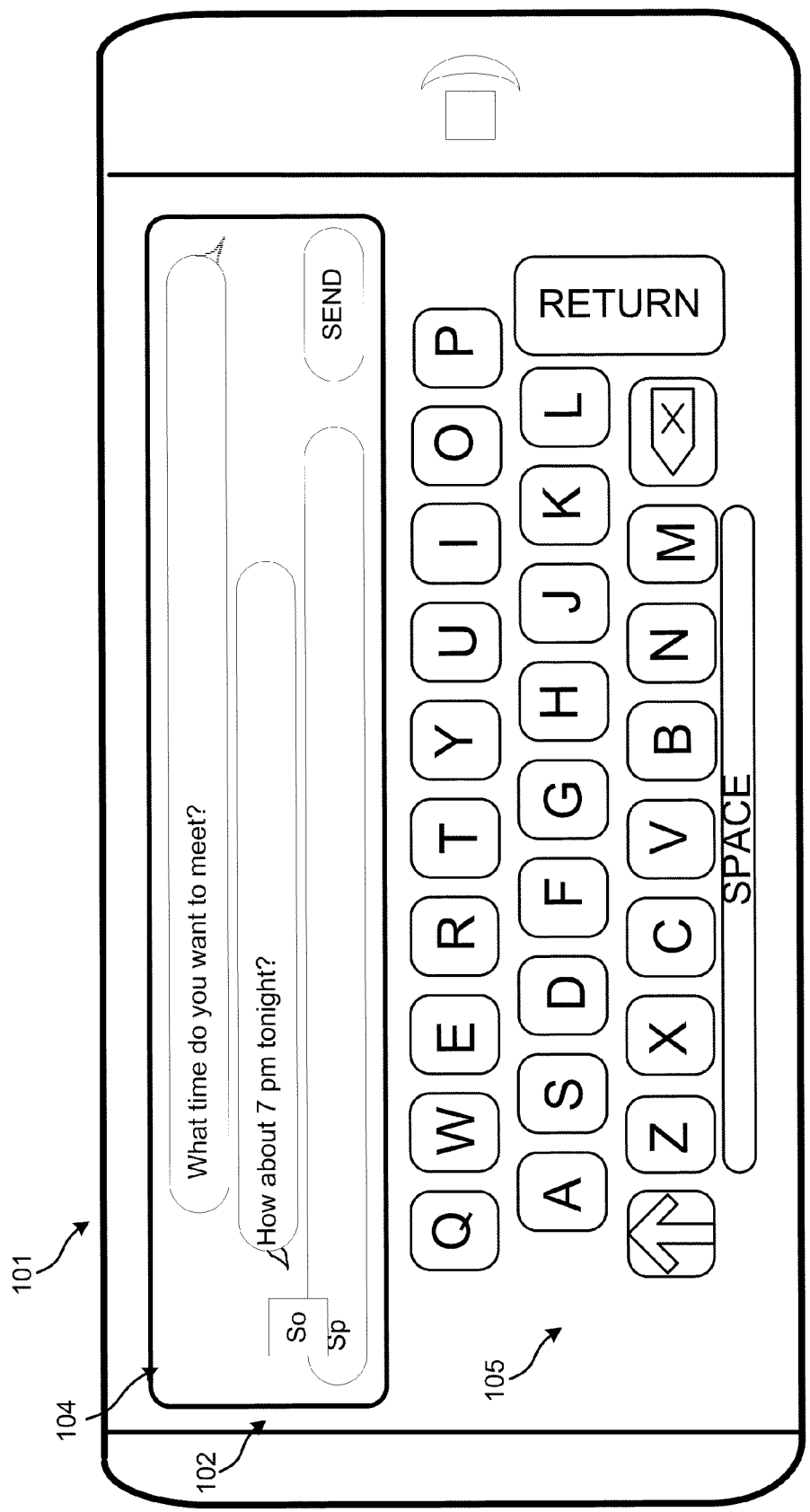
FIG. 2 is an illustration of a prior art virtual keypad.

FIG. 2 is an illustration of an example conventional virtual keypad displayed on a conventional touch screen display 102 of a mobile device 101. The touch screen display 102 may include a display area 104 which displays to the user the keystrokes recorded as well as a virtual keypad area 105 which mimics the traditional QWERTY keypad layout. Each letter is afforded its own individual key in the conventional virtual keypad layout. As shown in FIG. 2, mobile devices may be provided with a touch screen display 102 that constitutes a majority of the total real estate available on a mobile device. In instances where the virtual keypad is not needed, the increased display size allows the user to view larger images and more complete screen shots which is highly desirable when performing tasks such as viewing Internet web pages.

Conventional touch screen displays 102 may have the ability to discern when and where on the touch screen display surface a user has touched. However, conventional touch screen display do not measure or discriminate the amount of pressure exerted by each touch of the display surface. Thus, conventional touch screen displays may determine when and where a user touches the display surface but cannot determine how hard the user touched the surface. One drawback of conventional touch screens has been that any pressure exerted on the touch screen surface may register as a touch and result in an unintended keystroke entry. Consequently, users can not rest their fingers on a conventional virtual keyboard. Rather, users are forced to hover their fingers above the keys which may lead to user fatigue and decreased data entry throughput.

Despite the larger touch screen displays 102, users still complain that conventional virtual keyboards are difficult to use and often result in unintended keystrikes (i.e., adjacent keys being mistakenly entered). This often leads to user frustration and reluctance to use the virtual keypad. Some solutions have attempted to solve this problem with mixed results. For example, some mobile devices rely on a form of predictive word technologies to improve the user data entry throughput. However, such solutions require increased processing time and user review and acceptance of predicted keystrokes, thereby slowing the rate at which data may be entered. Moreover, current predictive word technologies are unable to predict unusual words or numbers, such as names and addresses.

Innovations in touch screen technologies are expected to provide mobile device designers with pressure sensitive displays. New pressure sensitive technologies that may soon be incorporated into touch screen displays will allow a mobile device to not only determine where a user touched the touch screen display surface but also how hard the user touched the surface. As an example, Stantum Inc. produces a high quality resistive touch screen display surface for incorporation into mobile devices that measures both where a user touches the touch screen display surface as will as how hard the user touches the touch screen display surface. A demonstration of the Stantum touch screen display capabilities may be viewed at http://www.stantum.com/spip.php?page=video. Employing such pressure sensing touch screen displays may enable mobile devices to be configured so, users can rest their fingers lightly on the touch screen without such touches being detected as unintended keystrokes. The various embodiments make use of such pressure sensing touch screen displays to provide mobile devices with alternative virtual keypad layouts which may improve the user experience.

Figure 3:
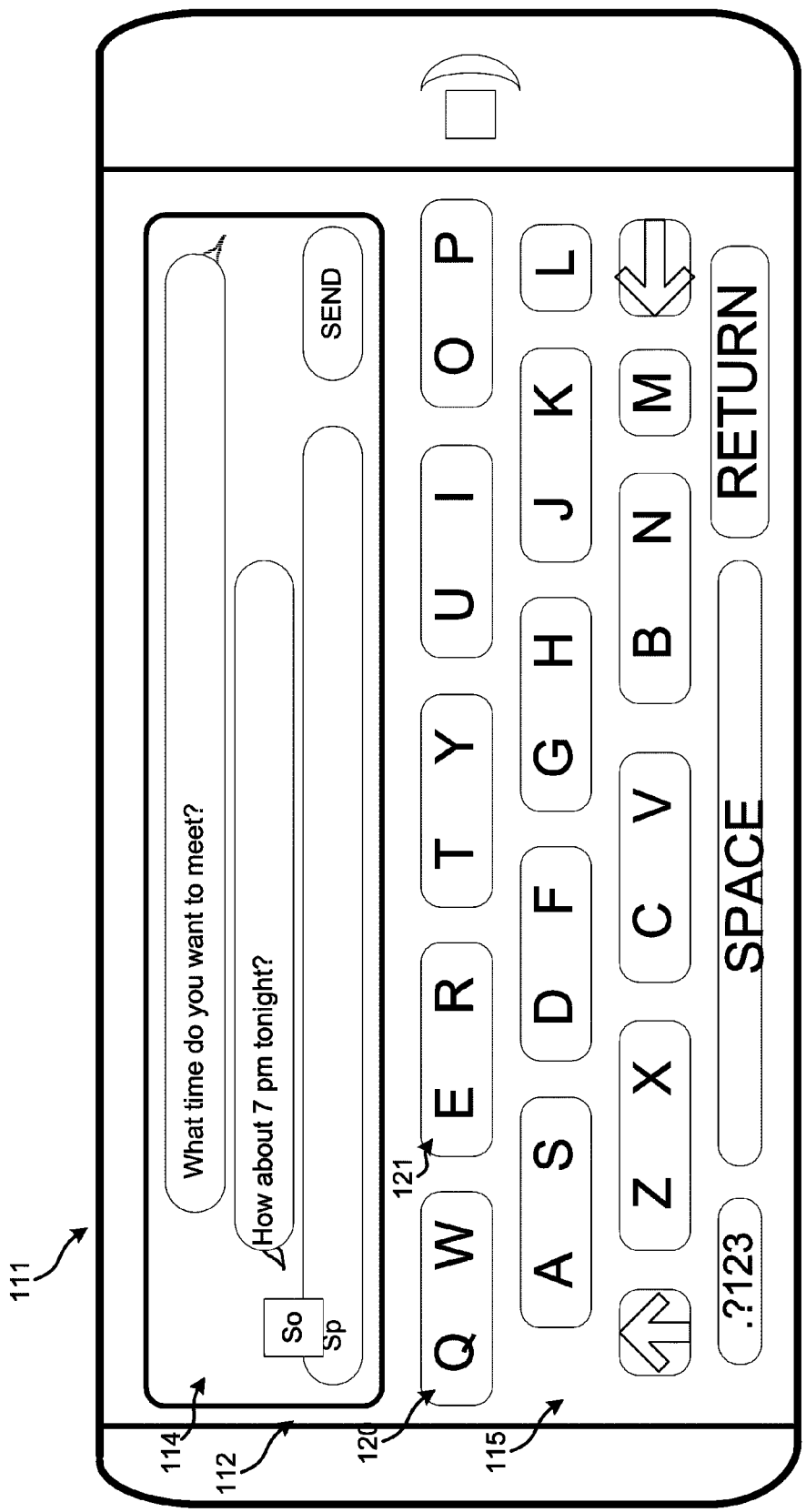
FIG. 3 is an illustration of an embodiment virtual keypad layout that co-locates some keys in a touch screen display.

FIG. 3 is an illustration of such an embodiment virtual keypad layout that makes use of pressure sensing touch screen display technologies. In the embodiment illustrated in FIG. 3, a mobile device 111 includes a pressure sensing touch screen display 112 that enables the mobile device to determine the location and magnitude of force exerted by a user touch on the touch screen surface. In the example illustration, the display is divided into two areas: the first area being a display area 114 which shows the keystrokes that have been detected; and the second area being the virtual keypad area 115. In contrast to conventional virtual keypads (see e.g., FIG. 2, 105) the virtual keypad 115 in the illustrated embodiment presents a QWERTY style keypad layout in which single keys are used for two letters. For example, the QW key 120 is used for both letters Q and W. By combining two letters into a single key, the virtual keypad display can provide larger keys that are spaced further apart which should help reduce keystroke errors. The larger keys and the wider spacing between keys should decrease the probability of an inaccurate keystroke of an adjacent key. While the only two possible key entries are assigned to a single combined key in the embodiment virtual keypad illustrated in FIG. 3, more than two possible key entries may be combined into a single key. For example, an embodiment virtual keypad may include of a single numeral key which combines digits 0-9.

In order to distinguish between the two letters assigned to a key (e.g., between Q and W) the mobile device may be configured to measure the pressure applied to the key using the capabilities of a pressure sensing touch screen display. By correlating the two letters or numbers to different amounts of measured pressure, the mobile device can determine which of the two keys to record based upon the measured force applied in the keystroke. When using a mobile device with such capability, a user may apply different amounts of force to indicate the intended keystroke. For example, if the user intends to enter a Q, the user may lightly strike the QW key, whereas if the user intends to enter a W, the user may strike the QW key with greater force. The mobile device may correlate each letter or number associated with a combined key with a range of measured pressure values. In order to determine which of 10 digits is intended from the press of a single numeric key, the mobile device may measure the applied force and compare the measured value against a table of pressure ranges correlated to each of the ten number values.

Figure 4:
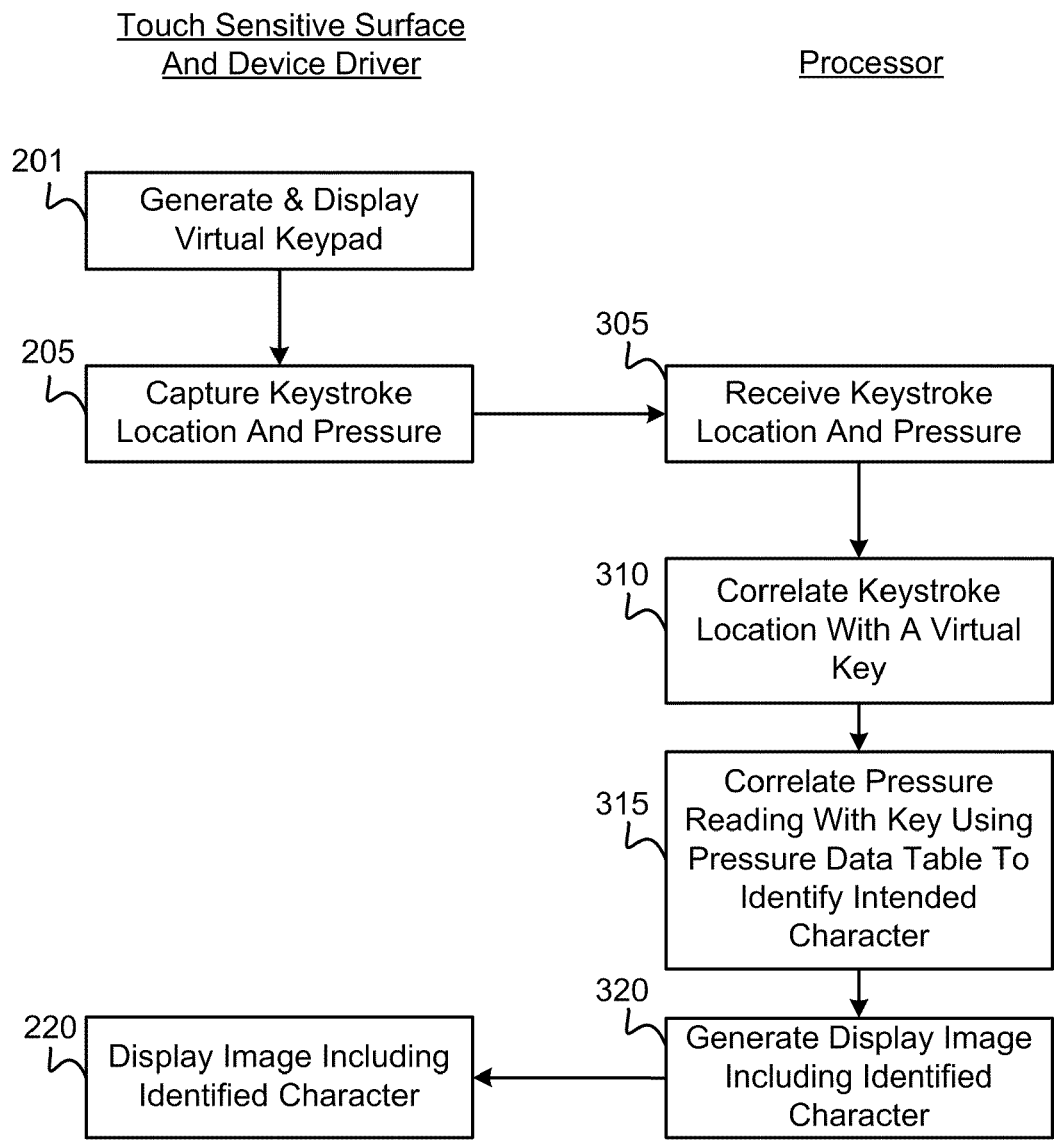
FIG. 4 is a process flow diagram illustrating an embodiment method for using touch pressure to identify intended keystrokes on the embodiment virtual keypad layout illustrated in FIG. 3.

FIG. 4 is a process flow diagram illustrating an embodiment method for detecting and interpreting user keystrokes on the embodiment virtual keypad layout illustrated in FIG. 3. Each time a request is made by an application to display the keypad, a touch sensitive surface and device driver in communication with the mobile device processor may generate and display a virtual keypad layout such as illustrated in FIG. 3, step 201. When a user strikes a key image on the virtual keypad the pressure sensing touch screen may capture the location of the keystroke as well as measure the amount of pressure exerted by the keystroke, step 205. Both the keystroke location and pressure measurement may be communicated to and received by the mobile device processor, step 305. The mobile device processor may correlate the keystroke location with a virtual key by comparing the detected touch location coordinates with the virtual keypad key coordinates, step 310. This may be accomplished in a data table look up process in which the touch coordinates are used to look up the characters associated with the touch location. For example, if the user touches the pressure sensitive touch screen where the QW key 120 is being displayed, the processor may correlate the location of the touch with the letters Q and W. Once the correlated letters are determined, the mobile device processor may disambiguate the keystroke (i.e., discern which key of the correlated keys the user intended to enter) by using the measured pressure exerted by the user to determine the intended letter, step 315. This process may be accomplished in a data table look up operation, where the measured pressure is compared to pressure ranges in a pressure data table to determine a corresponding letter. An illustrative pressure data table is shown in FIG. 5.

Figure 5:
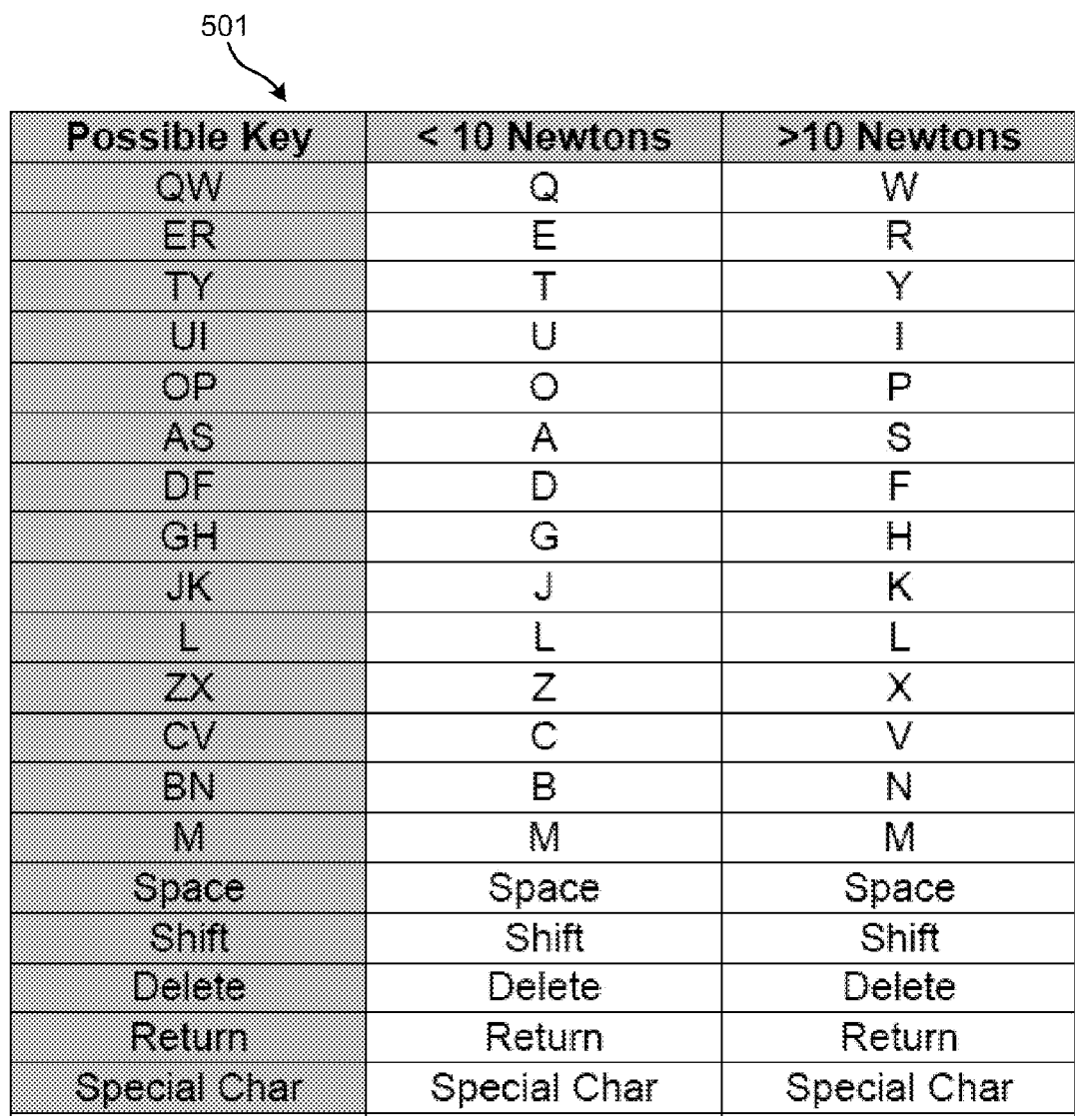
FIG. 5 is a data structure of a pressure data table suitable for use in an embodiment.

Referring to FIG. 5, the first column of a pressure data table 501 may identify the possible characters associated with a particular virtual key. As described above, the mobile device processor may determine the pressed key based upon the location coordinates of the user keystroke (see step 310). Once the processor has determined the touched key, the measured pressure can be compared to the ranges in the pressure data table 501 to determine the corresponding key. Using the example from above where the user has struck the QW key 120, if the magnitude of force exerted on the touch screen surface is measured to be less than 10 Newtons of force the processor may determine from the pressure data table 501 that the user intended to input the letter Q. If, however, the magnitude of force exerted on the touch screen surface is measured to be more than 10 Newtons the processor may determine that the user intended to input the letter W. It is noted that in the illustrative virtual keypad layout shown in FIG. 3 some of the keys are associated with single letters or functions. For example, the "L," "M," space, shift, delete, and return keys each represent a single character or function. Thus, the processor will not have to access the pressure data table 501 to determine the corresponding key since such keystrokes will be unambiguous. Nevertheless, the pressure data table 501 may correlate the same letter with both pressure ranges as illustrated.

Referring back to FIG. 4, once the keystroke has been disambiguated (i.e., the intended character determined), the mobile device processor may record that character as an input and generate a display image of the identified character or perform the discerned function, step 320. If appropriate, an image of the identified character may be displayed on the touch screen, step 220. As users become more adept at controlling the amount of pressure applied in individual keystrokes the embodiment virtual keypad layout and detection method may allow users to enter data with increased speed.

Figure 6:
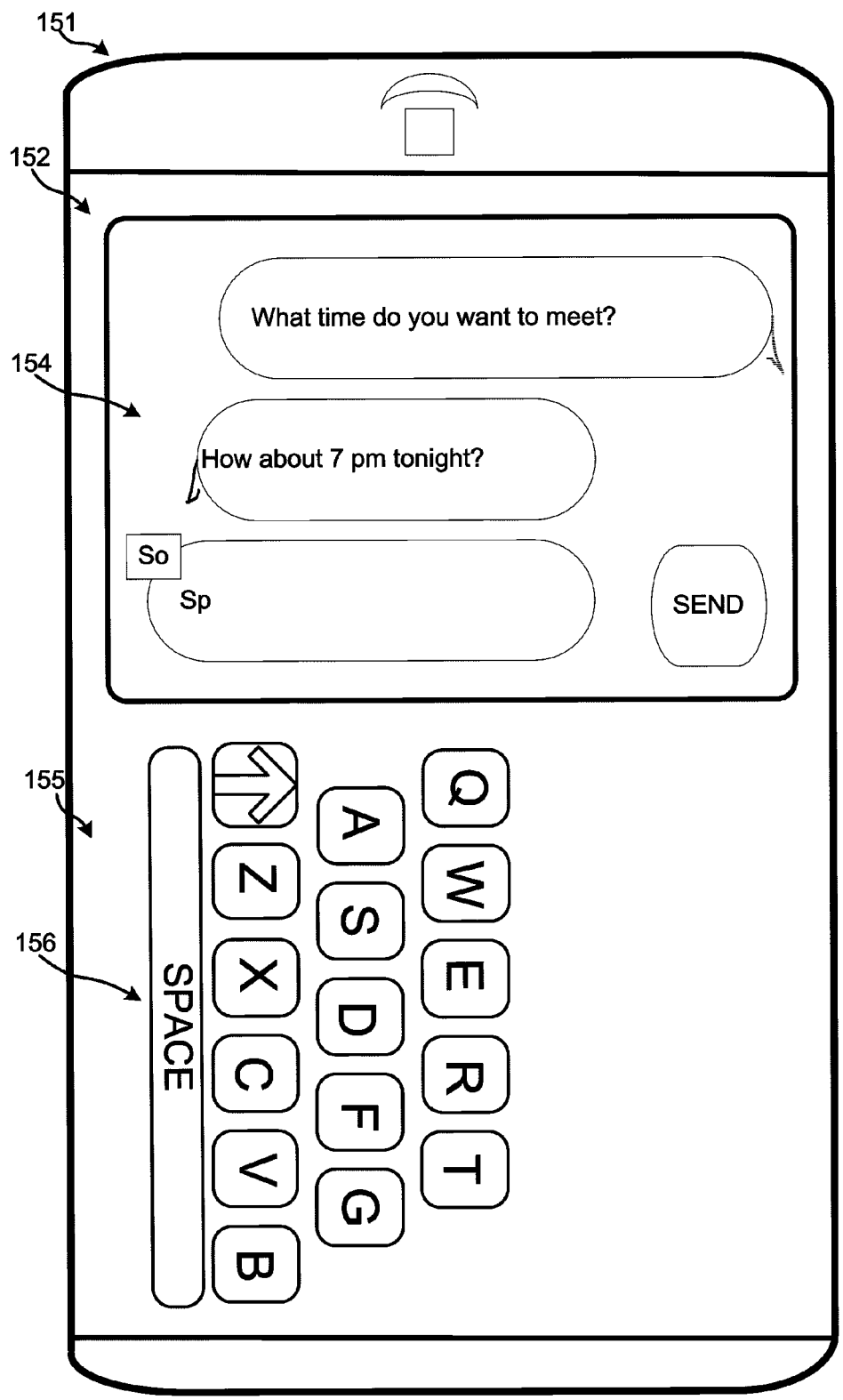
FIG. 6 is an illustration of an embodiment virtual keypad layout showing a left hand keys.
Figure 7:
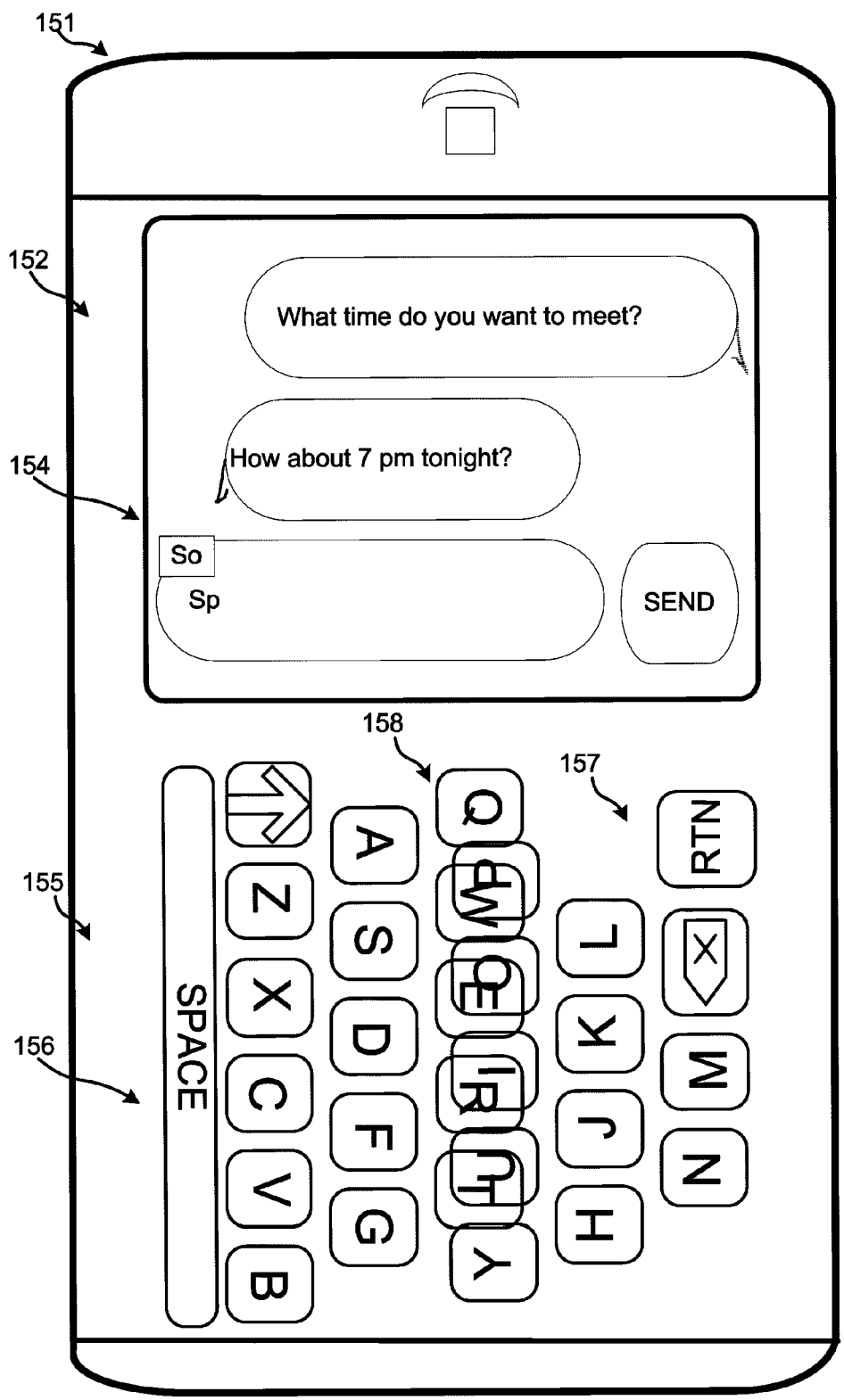
FIG. 7 is an illustration of the embodiment virtual keypad layout both left hand and right hand keys with some keys overlapping.

In another embodiment illustrated in FIGS. 6 and 7, an alternative virtual keypad layout may be implemented that may enable increased typing speed by using pressure measurement or touch shape information to disambiguate keystrokes on overlapping keys. As illustrated, by increasing the width of typical mobile device touch screens slightly a virtual keypad layout similar to many ergonomic "natural style keyboard" layouts may be implemented. Bio-mechanic analysis has lead to the development of an ergonomic keyboard which is intended to minimize muscle strain and stress often occurring during repetitive stress exercises such as typing on a keyboard. By splitting the keys of a traditional QWERTY keyboard layout into two groups and adjusting the angle separating the two groups of keys to more closely match the natural pronation of the user's hands, muscle strain and stress may be minimized.

FIG. 6 illustrates left hand keyboard portion 156 of the virtual keypad layout displayed on a mobile device 151. The mobile device 151 includes a display screen 152 which includes a display area 154 as well as virtual keypad area 155. In this embodiment, the left hand portion 156 is nearly perpendicular to the display area 154.

FIG. 7 illustrates the full virtual keypad layout 155 displayed on a mobile device 151 including both the left hand portion 156 and the right hand portion 157. By increasing the overall width of the mobile device slightly and thus, the size of the touch screen display 152, the size of the individual character keys in both the left and right hand portions 156, 157 may be displayed large enough to decrease the probability of erroneous keystrokes (i.e., unintended keystrokes to adjacent keys). To make best use of the display area, the top row of keys in the right hand portion 157 may overlap the top row of keys of left hand portion 156 in an overlap region 158. When the user strikes any key not in the overlap region 158, the processor can determine the intended character using conventional processing, such as described above with reference to step 310 in FIG. 4. However, when a user strikes a key in the overlap region 158 further processing is required to disambiguate the keystroke. Pressure measurement information received from a pressure sensing touch screen display may be used to accomplish such disambiguation.

In an embodiment method for disambiguating keystrokes in the overlap region 158, a baseline location reading of all finger touches on the touch screen may be obtained to determine the location of the user's fingertips resting on the display surface. Unlike conventional touch screen displays, the pressure sensing touch screen display can distinguish between fingers resting on the surface and keystrokes in which pressures is applied to the surface. Not only is such a user interface more comfortable to use, the resting location information can be used to determine which finger has been moved to accomplish the keystroke in the overlap region 158. By analyzing which fingertip is no longer in its baseline position the mobile device processor may determine which of the overlap keys the user intended to touch. For example, the W and the P keys overlap in the illustrated example virtual keyboard layout. Users normally press the W key with the ring finger of their left hand and press the P key with the little finger of their right hand. Thus, by noting which finger has left its rest position to accomplish the keystroke in the overlap region 158, the processor can determine which hand made the keystroke, and from this information, determine which of the two overlapping keys was intended to be struck by the user. The processor may accordingly correlate the received keystroke in the overlap region with the appropriate character.

Figure 8:
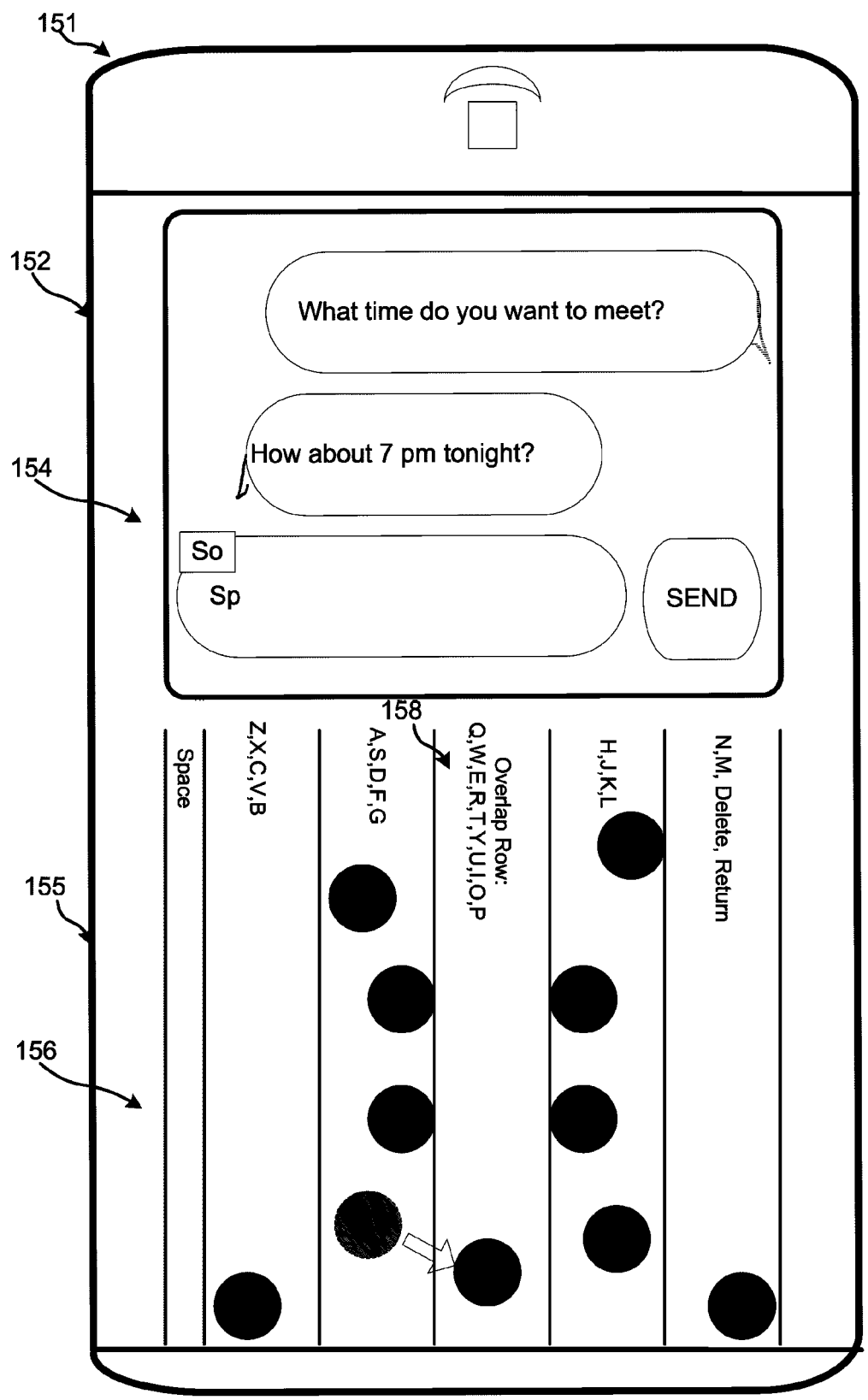
FIG. 8 is an illustration of a user's baseline finger tip resting position showing movement of one finger to execute a keystroke in an overlap region.

FIG. 8 illustrates example baseline positions of a user's fingertips resting on the embodiment virtual keypad layout shown in FIG. 7. When a processor receives an indication that a keystroke has occurred in the overlap region, the processor must disambiguate the keystroke to determine which of the overlapping keys the user intended to strike. By checking the current position of each fingertip resting on the display surface, the processor may determine which fingertip is no longer in its baseline position. Using this information, the processor may determine which of the overlapping keys was intended by the user. In the example shown in FIG. 8, the positions of the user's fingertips resting on the display surface are identified by the dark gray circles. For most users the left hand fingertips will naturally rest on the "A," "S," "D," and "F" keys or at least somewhere in the "A, S, D, F, G" row. The left hand thumb may typically rest on the "V" key or at least somewhere in the "Z, X, C, V, B" row. The right hand fingertips will naturally rest on the "J," "K," and "L" keys or at least somewhere in the "H, J, K, L" row. The right handed thumb may rest on the "N" key position or at least in the "N, M, Delete, Return" row. It should be noted that the fingertip positions shown in FIG. 8 are intended to be illustrative only. Actual user baseline fingertip positions may vary.

In the illustrated embodiment virtual keypad layout, the overlap region 158 contains the "Q," "W," "E," "R," "T," "Y," "U," "I," "O," and "P" keys. Typically, to strike the "Q" key a user may use the little finger on the left hand. To strike the "W" key a user may use the ring finger on the left hand. To strike the "E" key a user may use the middle finger on the left hand. To strike the "R" key a user may use either the middle or index finger on the left hand. To strike the "T" key a user may use the index finger on the left hand. To strike the "Y" key a user may use the index finger on the right hand. To strike the "U" key a user may use the middle or index finger on the right hand. To strike the "I" key a user may use the middle finger on the right hand. To strike the "O" key a user may use the ring finger on the right hand. To strike the "P" key a user may use the little finger on the right hand. As shown in FIG. 7, in the overlap region the "W" key may overlap the "P" key. Thus, a keystroke in the area of both the "W" key and the "P" key will be ambiguous requiring the processor to accomplish further processing to determine the intended character entry. By determining that the index finger of the left hand has moved from the baseline position (shown as a light grey circle and arrow) when the keystroke to the area of the "T" or "U" keys was made, the processor can determine that the user intended to strike the "T" key and not the "U" key. Similarly, the processor may be able to determine whether the user intended to strike the "E" or "O" key, "R" or "I" key, or "T" or "U" key by determining which finger from which hand (left or right) has moved from the baseline position to execute the keystroke in the overlap region.

Figure 9:
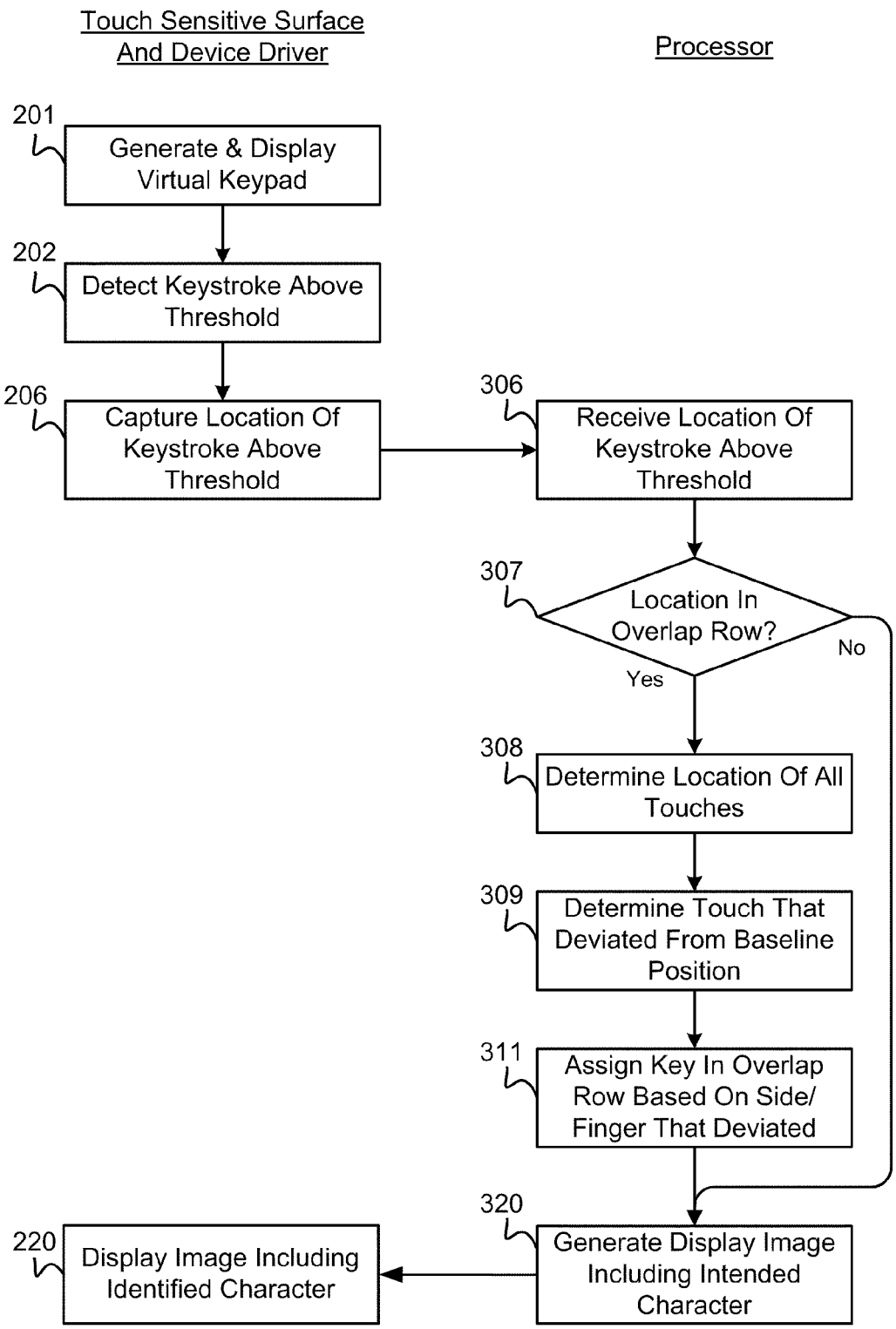
FIG. 9 is a process flow diagram of an embodiment method for disambiguating a keystroke in an overlap region.

FIG. 9 is a process flow diagram illustrating an embodiment method for disambiguating keystrokes in the overlap region 158 of the virtual keypad layout embodiment illustrated in FIG. 7. Similar to the process flow depicted in FIG. 4, each time the keypad is requested to be displayed by an application, a touch sensitive surface and device driver in communication with the mobile device processor may generate and display a virtual keypad layout such as the embodiment shown in FIG. 7, step 201. The pressure sensing touch screen may detect a keystroke above a certain pressure threshold, step 202. Because the user may be resting fingertips on the display surface, keystroke pressure must be above a certain threshold to distinguish keystrokes from the resting fingertip positions. If a keystroke above the pressure threshold is detected then the location of the keystroke may be captured, step 206. The location of the keystroke may be communicated to the processor, step 306, such as in the form of display coordinates. The processor may determine if the location of the keystroke is in the overlap region 158, determination 307. If the keystroke is not in the overlap region (i.e., determination 307=No), the processor may correlate the keystroke location to the corresponding character, such as using the location coordinates to look up the corresponding character without further processing, record the character entry and generate the display image of the intended key, step 320. The display image may be communicated to the touch screen for display to the user, step 220.

If the keystroke is in the overlap region (i.e., determination 307=Yes), the processor may determine the current location of all touches on the display surface that are below the pressure threshold, step 308. This may involve requesting the pressure sensing touch screen to report the location of all touches on the display surface. Alternatively, the pressure sensing touch screen may continuously report the location of all touches including those below the pressure threshold, in which case the processor may simply access such touch location data from a buffer memory. The processor may compare the received locations of all current touches with a stored baseline position to determine which touch has deviated from the baseline position, step 309. The baseline position data may be obtained by frequently obtaining the locations of all touches below the pressure threshold and storing the positions in memory. In this manner, the positions of all below threshold touches just prior to receipt of a keystroke above the threshold may be available in memory. In an alternative embodiment, the processor may determine an average position of a user's fingers based upon a number of observations of the locations of all touches below the pressure threshold and use that average as the baseline position. By determining which fingertip or side (i.e., right hand side vis-à-vis left hand side) has deviated from its baseline position, the processor may disambiguate the keystroke in the overlap region in the manner described above, step 311. Once the processor has determined which key the user intended to strike, it may record an entry of the corresponding character and generate the display image of the character, step 320. The display image may be communicated to the touch sensitive surface and device driver for display to the user, step 220.

In another embodiment, the appropriate character to assign to a keystroke located in the overlap region 158 may be determined by analyzing the shape and/or orientation of the keystroke touch. A keystroke in the overlap region 158 from a finger on the left hand may have a shape and/or orientation as sensed by the touch screen that differs from the shape and/or orientation of a keystroke from a finger on the right hand. Typically, when users rest their fingertips on the display screen surface the touches may appear approximately circular. However, when users reach for a key in the overlap region 158, the shape of the touch on the display screen surface may appear oblong in shape. In some instances, the oblong shape may resemble a teardrop.

Figure 10:
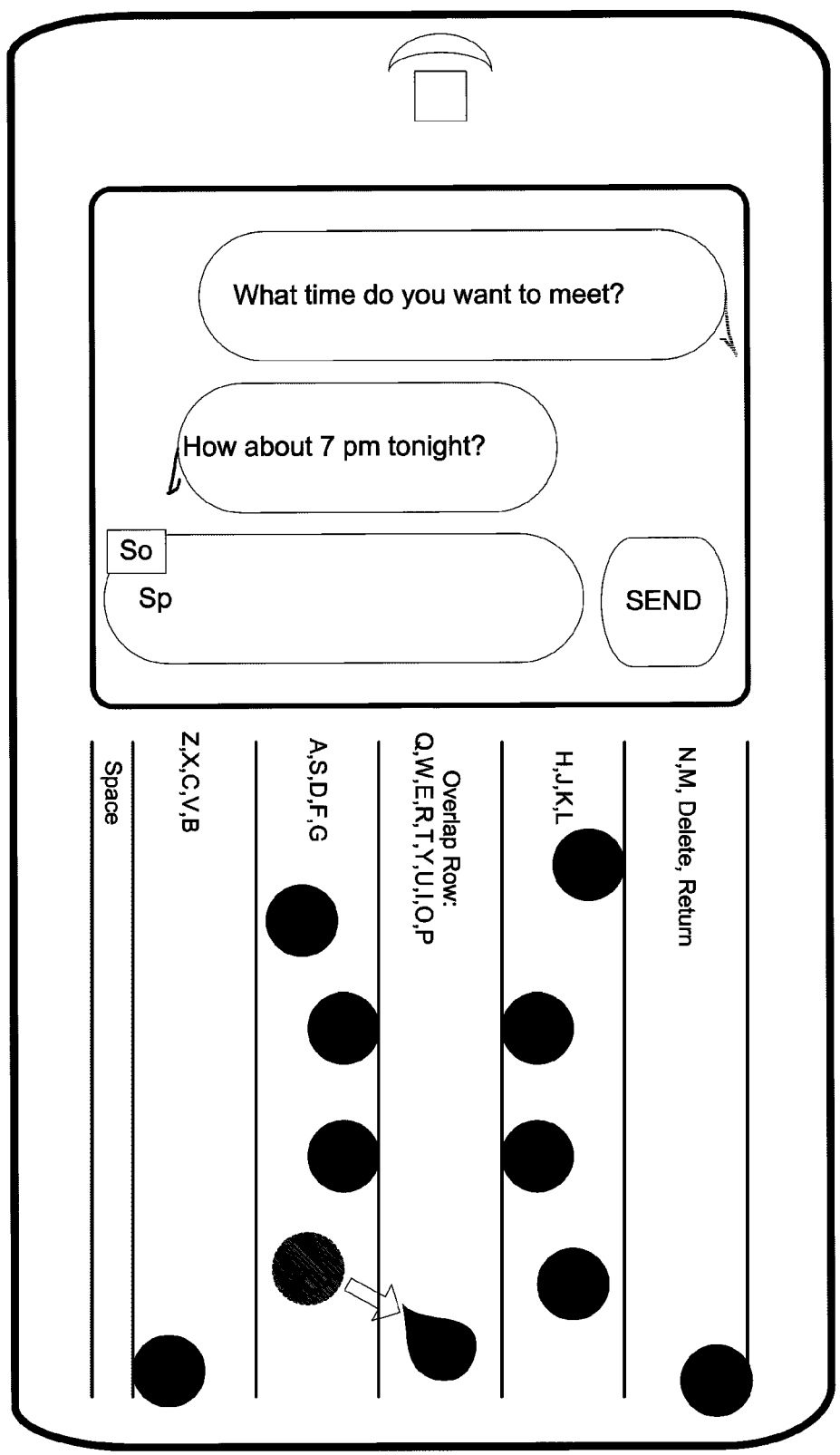
FIG. 10 is an illustration of a shape of a user's keystrokes on a touch screen surface when executing a strike to a key in an overlap region.

FIG. 10 illustrates the unique touch shape that may occur when a user executes a keystroke in the overlap region. FIG. 10 depicts nine stationary finger positions resting in their baseline position plus the touch shape of the index finger from the user's left hand executing a keystroke in the overlap region 158. Due to the extension of the index finger and natural positioning of the remainder of the user's hand, the touch shape created on the touch screen surface may appear as a teardrop or some other recognizable shape. In the example shown in FIG. 10, the tail of the teardrop shape points to the side of the display whose hand executed the keystroke (i.e., the left hand in the illustrated example). By analyzing the touch shape and orientation of a keystroke in the overlap region, the processor may disambiguate a keystroke on overlapping keys in the overlap region 158.

In an embodiment, the analysis of the touch shape may involve determining the side of the keypad layout to which the tail section of the teardrop touch shape points. If the tail section points to the left, then the keystroke may be determined to have been made with a finger on the left hand, and therefore the left hand overlapping key was pressed (i.e., one of W, E, R or T). Similarly, if the tail section points to the right, then the keystroke may be determined to have been made with a finger on the right hand, and therefore the right hand overlapping key was pressed (i.e., one of Y, U, I or O). As with the embodiment method described above with reference to FIG. 9, by determining which hand made the keystroke to a particular key location in the overlap region, the processor can determine the key that the user intended to strike.

Figure 11:
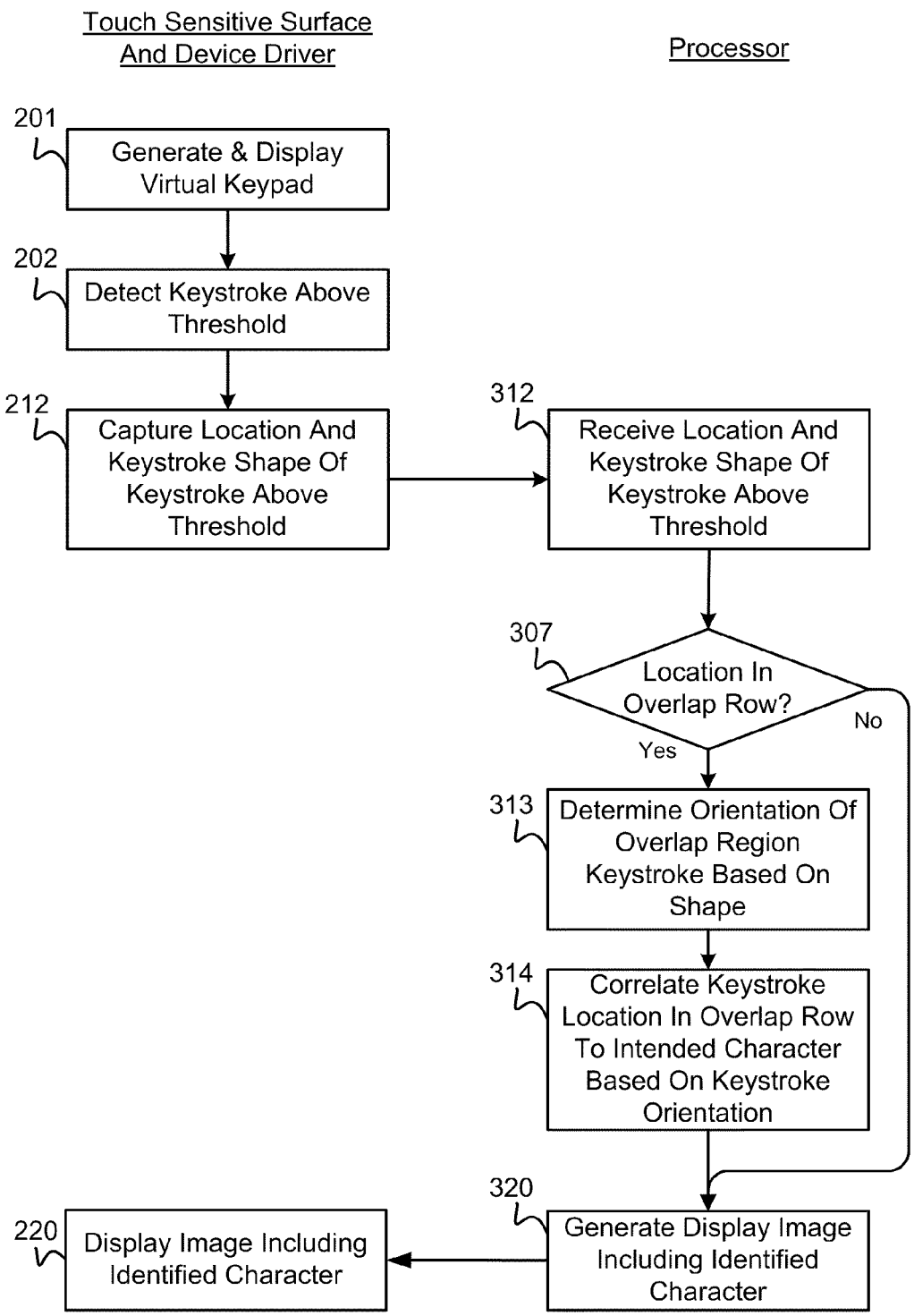
FIG. 11 is a process flow diagram illustrating another embodiment method for disambiguating a keystroke in an overlap region.

FIG. 11 is a process flow diagram illustrating an alternative embodiment method for disambiguating keystrokes in an overlap region. Similar to the process flow illustrated in FIG. 9, the pressure sensing touch screen displays the virtual keypad layout whenever a keypad is requested by the user or an application, step 201. The pressure sensing touch screen detects when a keystroke is made with a measures pressure above a threshold pressure, step 202. The pressure sensing touch screen may capture the location coordinates of the keystroke which includes the keystroke shape (i.e., outline coordinates), step 212. This information is communicated to the mobile device processor, step 312. Based on this information, the processor may determine whether the keystroke was made in the overlap region 158, determination 307. As described above with reference to FIG. 9, if the keystroke does not occur in the overlap region 158 (i.e., determination 307=No), then the processor may identify the corresponding character without further processing, and accept the character input and generate the display image of the identified character, step 320. The display image may be communicated to the pressure sensing touch screen for display to the user, step 220.

If the keystroke is determined to be within the overlap region (i.e., determination 307=Yes), the processor may determine the orientation of the overlap region keystroke, step 313. This may be accomplished by analyzing the touch shape to identify a long axis of other asymmetric characteristics. For example, in an embodiment where a teardrop touch shape is recognized, the processor may determine the orientation of the tail portion vis-a-vis the rest of the keystroke shape. This orientation of the tail portion may be used to determine the hand making the keystroke in the overlap region. In other embodiments the processor may determine the orientation of the long axis of a detected oblong touch shape created by an overlap region keystroke. Depending upon the overlapping keys, the angle of the long axis of the touch shape may be oriented in one direction for a left hand keystroke and in a different direction for a right hand keystroke.

Once the orientation of the overlap region touch shape is determined, the processor may disambiguate the keystroke in the overlap region in a manner similar to that discussed above with reference to FIG. 9. Specifically, by determining the hand that made the keystroke and the two overlapping keys at the keystroke location, the processor can determine which of the two keys was pressed (e.g., "T' or "U," "R" or "I," etc.). Once the processor has determined the key that was pressed, the processor may accept the corresponding character as an input and generate the display image of the identified character, step 320. The display image may be communicated to the pressure sensing touch screen for display to the user, step 220.

In another embodiment method for disambiguating a keystroke on an area of overlapping keys, the mobile device may utilize a learning module which can learn to distinguish different keystrikes based upon measured keystroke characteristics, such as shape and applied pressure. Using a learning module, the processor can collect data regarding a specific user's keystroke signatures. Such keystroke signature data may be gathered during training sessions during which the user types keys whose value is known to the learning module, such as a displayed text or in response to aural commands emitted by the mobile device speaker. Such keystroke signature data may include measurements of the unique locations where a user strikes a particular key, the unique shape of each keystrike and/or the unique amount of pressure the user exerts when striking each key. By collecting this data during a learning session, the processor may correlate subsequent strike locations, shapes and/or pressure readings to disambiguate keystrokes in the overlap region. As described more fully below, learning algorithms associated with the various embodiments may be implemented within a mobile device processor in a learning module, which may be a module of processor-executable instructions operating in the processor.

While the learning module and training routines are described below in the context of a QWERTY keyboard layout, the various aspects may be applied to define other types of keypads, such as numeric keypads and alphanumeric keypads with different key layouts. For example, the various aspects may also be applied to the variant forms of QWERTY keyboard layouts, including those defined for Canadian Multilingual Standard, Canadian French, Czech, Danish, Dutch, Faroese, Irish, Italian, Norwegian, Polish, Portuguese (Portugal), Portuguese (Brazil), Romanian (in Romania and Moldova), Slovak, Spanish (Spain), Spanish (Latin America), Swedish/Finnish, United Kingdom, United Kingdom extended, and US-International. The various aspects apply equally well to other types of keyboard layouts including, for example, QWERTZ (including those defined for Czech, Hungary, Germany, and Austria, Slovak, Bosnian, Croatian, Serbian (Latin), and Slovene, Serbian (Cyrillic), Swiss German, Swiss French, Swiss Italian, Liechtenstein, and Luxembourg), AZERTY (including those defined for French and Belgian), QZERTY, the Dvorak keyboard, the Colemak keyboard, Turkish, and chorded keyboards. Further, various aspects may be applied to keyboards optimized for non-Latin alphabets and non-alphabetic writing, including, for example, Arabic, Armenian, Greek, Hebrew, Russian, Ukrainian, Bulgarian, Devanagari, Thai, Khmer, Tibetan Script, Tibetan (China), Dzongkha (Bhutan), Chinese, Japanese, Hangul (for Korean), Dubeolshik, Sebeolsik 390, Sebeolsik Final, and Sebeolsik Noshift. Further, various embodiments could be applied to musical keyboards, such a piano keyboard.

Before users have taught the mobile device processor their unique keystroke signatures, the mobile device may display a virtual keyboard layout, such as the layout illustrated in FIG. 7. As the user interfaces with the virtual keyboard layout, the learning module may record the specific manner in which the user executes keystrokes in the overlap region. By comparing the characteristics of subsequent keystrokes to the keystroke signature data recorded during a learning session, the processor can disambiguate a keystroke in the overlap region 158.

Figure 12:
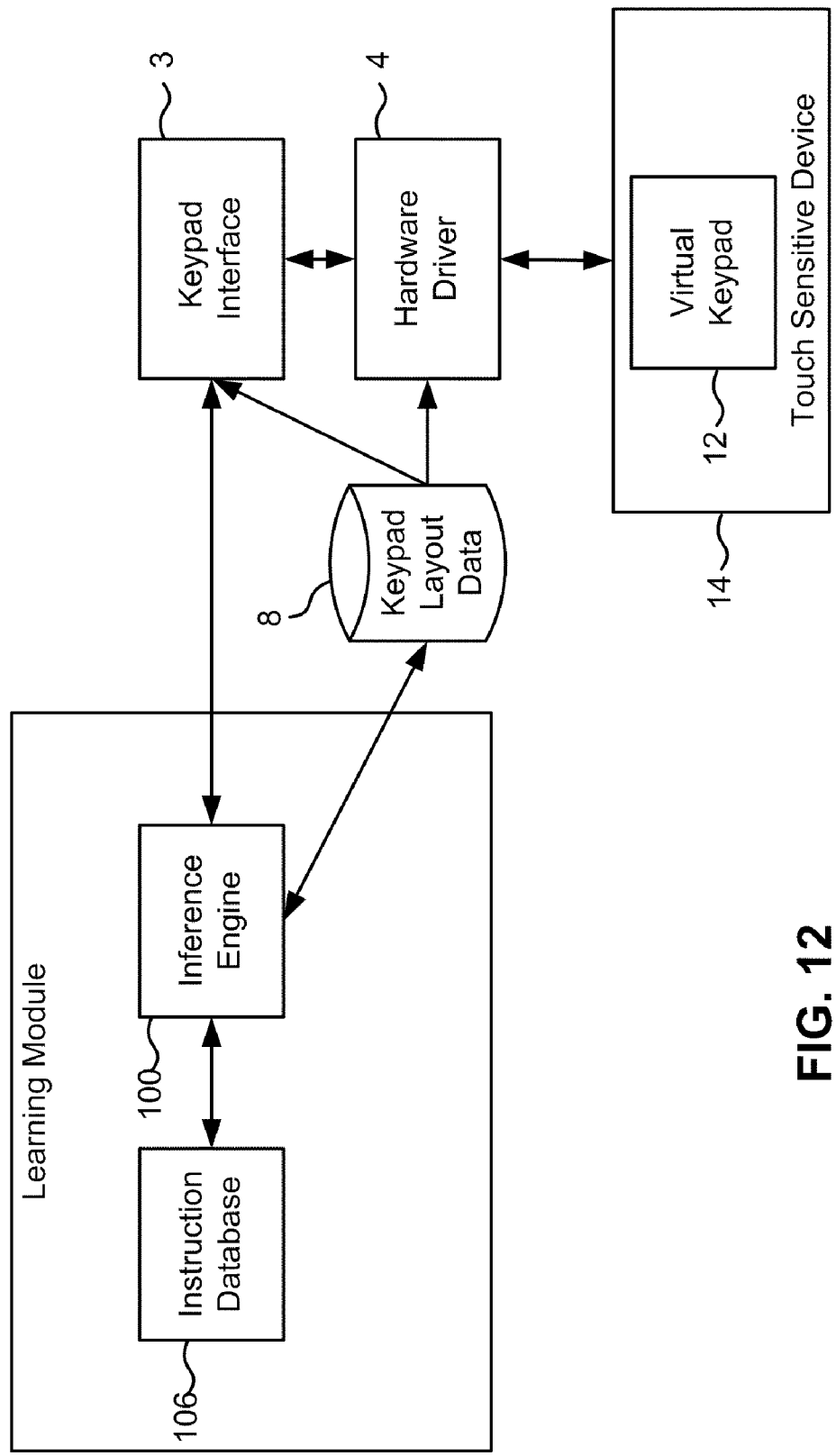
FIG. 12 is a system component diagram of a learning module according to an embodiment.

FIG. 12 is a system component diagram of a mobile device enabling the various embodiments. The mobile device may include a pressure sensing touch screen 14 on which is displayed a virtual keyboard 12. The pressure sensing touch screen 14 may be coupled to a hardware driver 4 which receives signals associated with keystrokes to the surface and translates those signals into keystroke event, coordinate and measured pressure signals that can be interpreted by the computing device operating system, such as a keypad interface 3. For ease of description the keypad interface 3 is illustrated as a process module, but it may be a part of the functionality of the computing device operating system or a firmware or hardware component of the computing device. In an example implementation, the keypad interface 3 functionality relays keystroke event signals to applications 2 operating within the context of the operating system in a format that can be interpreted by the application. Depending upon the hardware and computing device implementation, the hardware driver 4 for the pressure sensing touch screen 14 in combination with the keypad interface 3 may generate the virtual keyboard 12 display. Further, the hardware driver 4 and/or the keypad interface 3 may interpret keystrokes on the pressure sensing touch screen 14 as strikes to particular keys based on the location coordinates of the keystrokes. The hardware driver 4 and/or the keypad interface 3 may further determine the shape of each keystroke on a particular key depending upon the precision and resolution of the touch screen display. In addition, the hardware driver 4 and/or the keypad interface 3 may measure the magnitude of pressure exerted on the touch screen surface associated by each keystroke. The driver 4 and/or the keypad interface 3 may implement the various embodiments to disambiguate keystrokes in regions of overlapping keys or on multi-character keys. The keypad interface 3 then may communicate a key press event to the application 2 that identifies the pressed key as if from a physical keyboard.

In an embodiment, the keypad interface 3 may cooperate with a learning module 10 configured to gather keystroke signature data from a user's keystrokes. As described above, the learning module 10 may receive information regarding locations, shape and pressure of keystrokes (i.e., keystroke signature data) on the pressure sensing touch screen 14 from the keypad interface 3 or the hardware driver 4 and correlate this keystroke signature data with specific characters or functions. Thus, a strike to each key may have correlated keystroke signature data. The correlated keystroke signature data may then be stored in memory for subsequent use in disambiguating keystrokes. During subsequent virtual keyboard usage when there is input character ambiguity caused by a keystroke in an overlap region, the correlated keystroke signature data may be retrieved from memory and compared to the measured keystroke characteristics to determine a most likely match. By matching a keystroke characteristic to stored keystroke signature data, the processor can determine which of the two keys the user intended to strike.

In an embodiment, the learning module 10 may be processor-executable processes which may be implemented as an application 2, as a part of the mobile device operating system, or as part of a hardware driver 4. The learning module 10 may also receive information from other applications, such as a training application, spell checking applications (such as may be implemented within a word processing application), and auto-correction applications that can inform the learning module 10 of intended or predicted keystrokes. Using learning algorithms, artificial intelligence, or other inference processes, the learning module 10 may correlate gathered keystroke signature data to a desired or proper key, character or function. The keypad layout data 8 output of the learning module 10 may be in the form of a correlation matrix stored in memory that a keypad driver 4, keypad interface 3 or other element of the computing device operating system can use to translate keystroke signature data on a virtual keypad into an appropriate character (e.g., an ASCII character value).

The learning module 10 may include an inference engine 100 and an instruction database 106. The inference engine 100 may be in the form of processes and rules that are executed on the computing device processor. The learning module 10 may also include an instruction database 106 that may be stored in a memory which includes training commands and learning text samples that may be presented to a user during initial learning routines.

Figure 13:
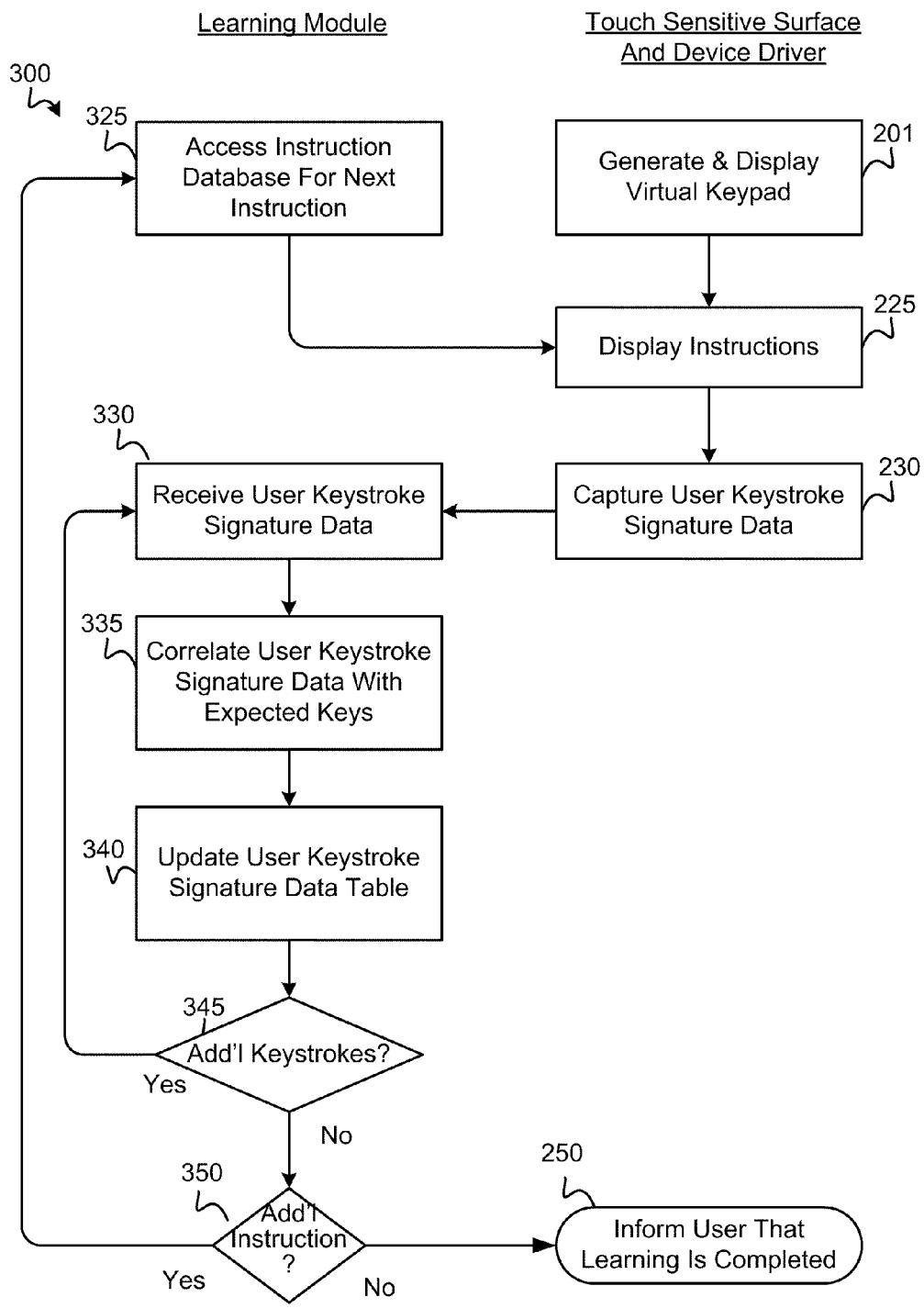
FIG. 13 is a process flow diagram illustrating a teaching routine for capturing a user's keystroke signature data for keystrokes in an overlap region.

FIG. 13 is a process flow diagram illustrating an example teaching process 300 for learning a user's keystroke signature data and correlating the keystroke signature data with intended keys. Referring to FIG. 13, while the touch sensitive surface and device driver has generated and displayed the virtual keyboard layout, step 201, such as the example illustrated in FIG. 7, the learning module may access the instruction database for the next instruction, step 325. The accessed instructions may be displayed to the user on the pressure sensing touch screen, step 225. The instruction may request that the user type in a phrase which requires the user to make at least one keystroke to each key in the overlap region 158. For example, the user may be requested to type in the phrase "The quick brown fox jumped over the lazy dog." This phrase may be chosen as it contains all of the 26 letters of the Roman alphabet at least once. As the user executes each keystrike to type each letter in the phrase, the pressure sensing touch screen may capture the user keystroke signature data, step 230. The keystroke signature data may be communicated to the learning module, step 330. The learning module may correlate the keystroke signature data to each letter in the instruction phrase, step 335. The learning module may then update a stored user keystroke signature data table with the received keystroke signature data for the expected key, step 340. As keystroke signature data is collected, the processor determines if additional keystrokes are needed to complete the phrase, determination 345. If additional keystrokes are expected (i.e., determination 345=Yes), the learning module returns to receiving the keystroke signature data for the next expected key, step 330. However, if the keystroke signature data for the last expected key has been received and updated (i.e., determination 345=No), the learning module determines if additional instructions are required, determination 350. If there are additional instructions (i.e., determination 350=Yes), the learning module may return to access the instruction database for the next instruction, step 325. If there are no additional instructions (determination 350=No), then the touch sensitive surface and device driver may display a message informing the user that the learning session is complete, step 250

Figure 14:
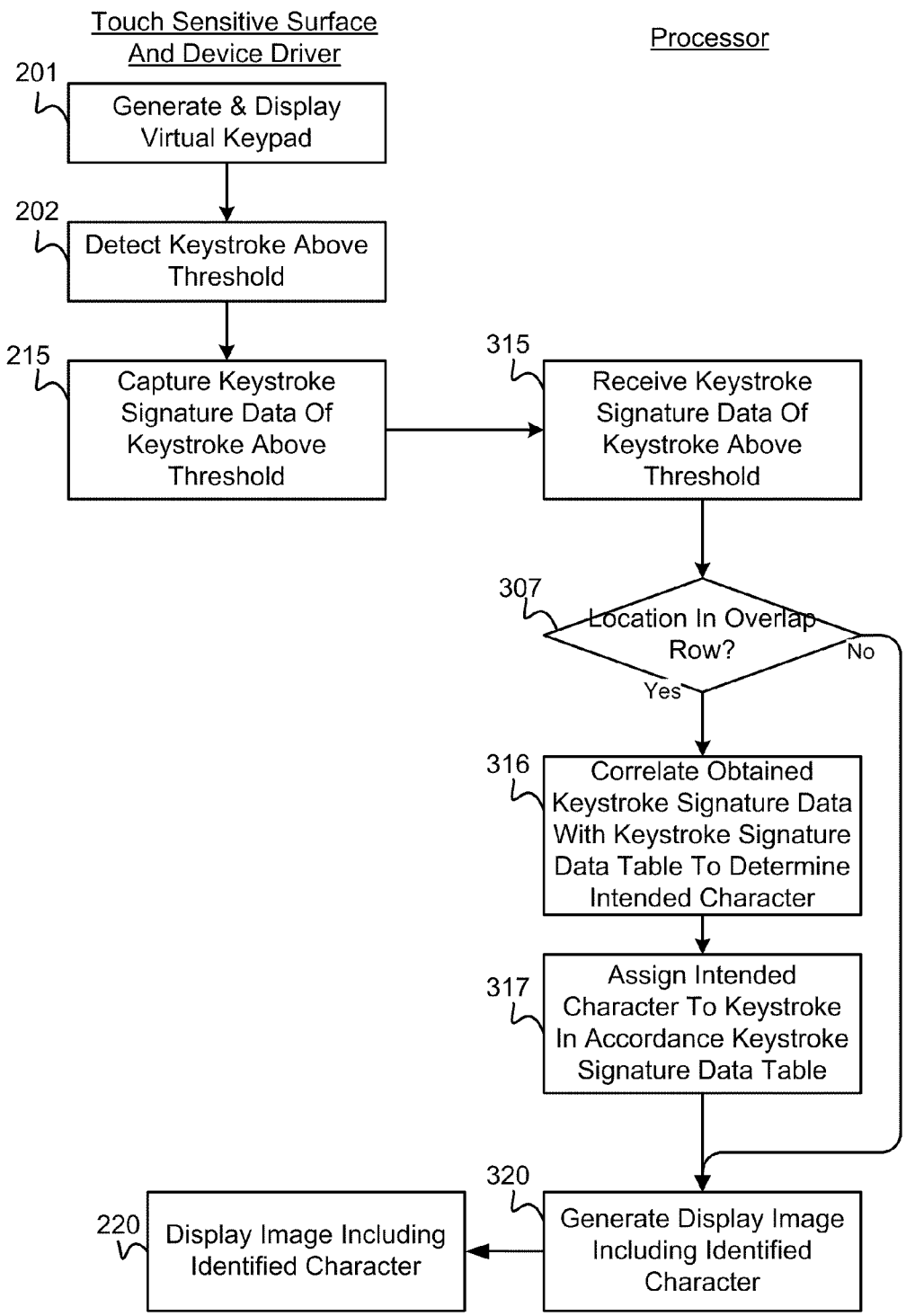
FIG. 14 is a process flow diagram illustrating another embodiment method for disambiguating a keystroke in an overlap region.

With the user's keystroke signature data updated in a signature keystroke data table, an embodiment method may be implemented to interpret a user's keystrokes using a virtual keyboard layout such as the one illustrated in FIG. 7. FIG. 14 is a process flow diagram illustrating steps that may be taken to disambiguate keystrokes in an overlap region using the learned keystroke signature data. As with the process flows described above with reference to FIGS. 9 and 11, a virtual keyboard is displayed (step 201) and keystrokes having a measured pressure above a threshold are detected (step 202). When a keystroke with a pressure above a threshold is detected, the pressure sensing touch screen may capture the keystroke signature data, step 215. Such signature data may include, for example, data regarding the location of the keystroke, the shape of the keystroke, the measured pressure exerted in the keystroke, etc. The keystroke signature data may be communicated to the mobile device processor, step 315. The processor may determine from the keystroke signature data whether the keystroke occurred in the overlap region 158, determination 307. If the keystroke is not in the overlap region 158 (i.e., determination 307=No), then the processor may correlate the keystroke location with a character without ambiguity, and accept the identified character as an input and generate a display image of the identified character, step 320. The display image may be communicated to the touch sensitive surface and device driver for display to the user, step 220.

If the keystroke is determined to be in an overlap region (i.e., determination 307=Yes), the processor may compare the received keystroke signature data to the user's keystroke signature data stored in the keystroke signature data table, step 316. By determining a closest match of the received keystroke signature data to the stored keystroke signature data and determining the character or key corresponding to the matched stored signature data the processor may disambiguate a keystroke in an overlap region 158, step 317. When the keystroke is disambiguated and a corresponding character identified, the identified character may be accepted as an input and the processor may generate a display image of the character, step 320. The display image may be communicated to the pressure sensing touch screen for display to the user, step 220.

Figure 15:
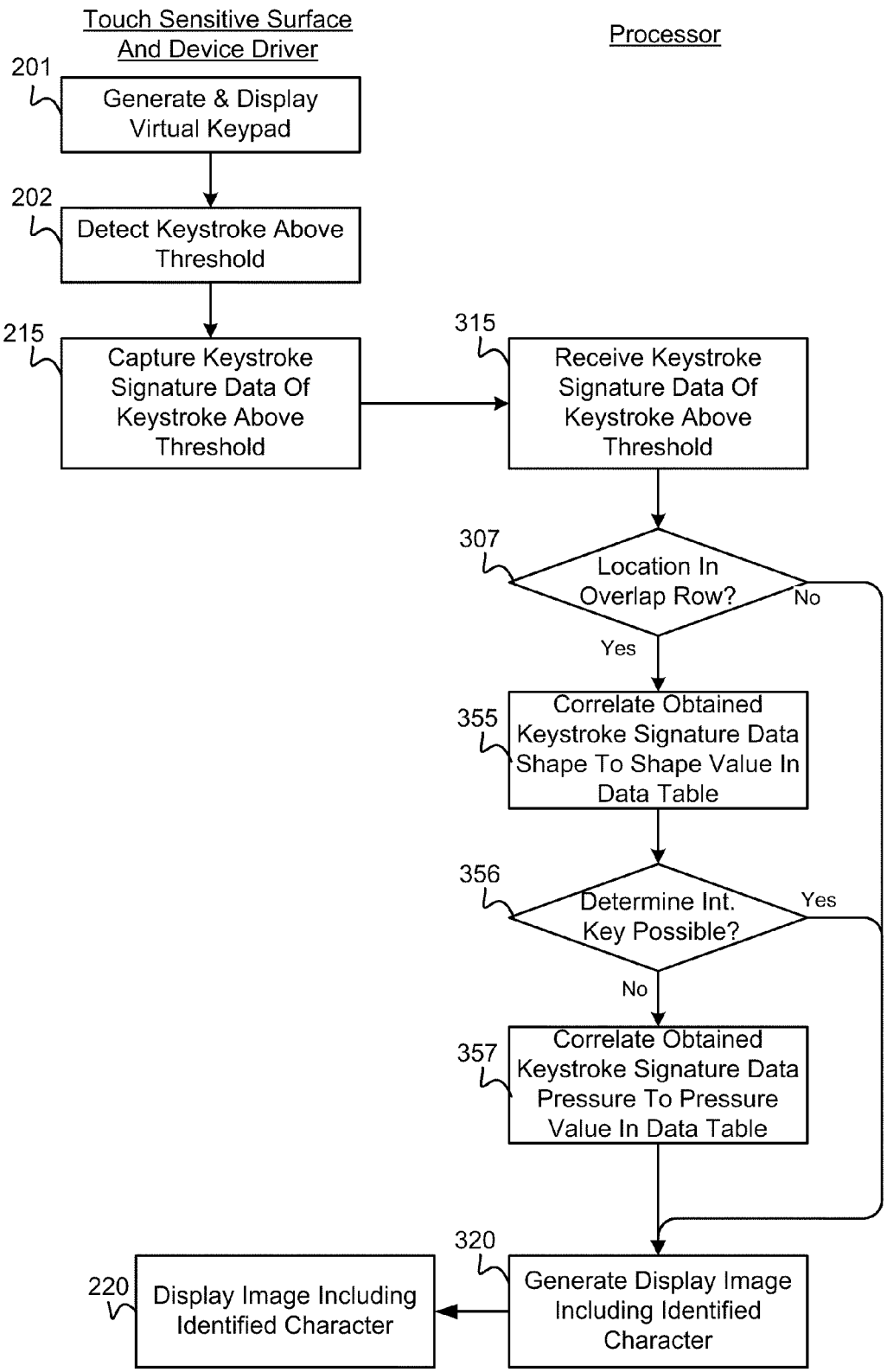
FIG. 15 is a process flow diagram illustrating another embodiment method for disambiguating a keystroke in an overlap region.

Another alternative embodiment for disambiguating keystrokes in an overlap region is illustrated in FIG. 15. In this alternative embodiment, the processor may attempt to disambiguate a keystroke by comparing individual keystroke signature data values to the keystroke signature data table. The keystroke disambiguation process may then terminate as soon as the intended key is determined. In alternative embodiment shown in FIG. 15, the processor performs steps 201, 202, 215 and 315 as well as determination 307 in the same manner as described above with reference to FIG. 14. If the keystroke is not in an overlap region (i.e., determination 307=No), the processor may identify the corresponding character without disambiguation processing, and accept the identified character as an input and generate a display image of the character, step 320. The display image may be communicated to the touch sensitive surface and device driver for display to the user, step 220.

If the keystroke is in an overlap region (i.e., determination 307=Yes), the processor may attempt to disambiguate the keystroke based upon the touch shape by comparing the received touch shape to touch shapes stored in the keystroke signature data table, step 355. If the processor matches the detected keystroke touch shape to a touch shape stored in the keystroke signature data table for one of the two (or more keys) in the overlap region, the processor may disambiguate the keystroke in the overlap region 158 as that of the character or key corresponding to the matched shape. In some instances, the shape of the keystroke may not match the touch shape for either of the particular overlapping keys stored in the keystroke signature data table. This may be due to abnormal keystroke movement by the user or possibly movement of the mobile device 151 while the user was making the keystroke. If there is not a sufficient match of the touch shape, the processor may be unable affirmatively disambiguate the keystroke. Therefore, after attempting to match the detected keystroke shape to a touch shapes stored in a keystroke signature data table, the processor may determine if the keystroke was disambiguated, determination 356. If the processor is able to select one of the two overlapping keys at the location of the keystroke, based on the touch shape alone (i.e., determination 356=Yes), the processor may accept the identified character as an input without further processing and generate the display image of the identified character, step 320. The display image may be communicated to the touch sensitive surface and device driver for display to the user, step 220.

If the processor is unable to disambiguate the keystroke based on the touch shape alone (i.e., determination 356=No), the processor may attempt to match the detected keystroke pressure measurement to pressure measurements in the stored keystroke signature data, step 357. By comparing measured pressure data and shape data to the stored keystroke signature data, the processor can perform a multi-variant comparison to select one of the two overlapping keys as the most likely intended key strike. Once the processor has identified a character corresponding to the keystroke, the processor may accept the identified character as an input and generate the display image of the identified character, step 320. The display image may be communicated to the touch sensitive surface and device driver for display to the user, step 220.

Figure 16:
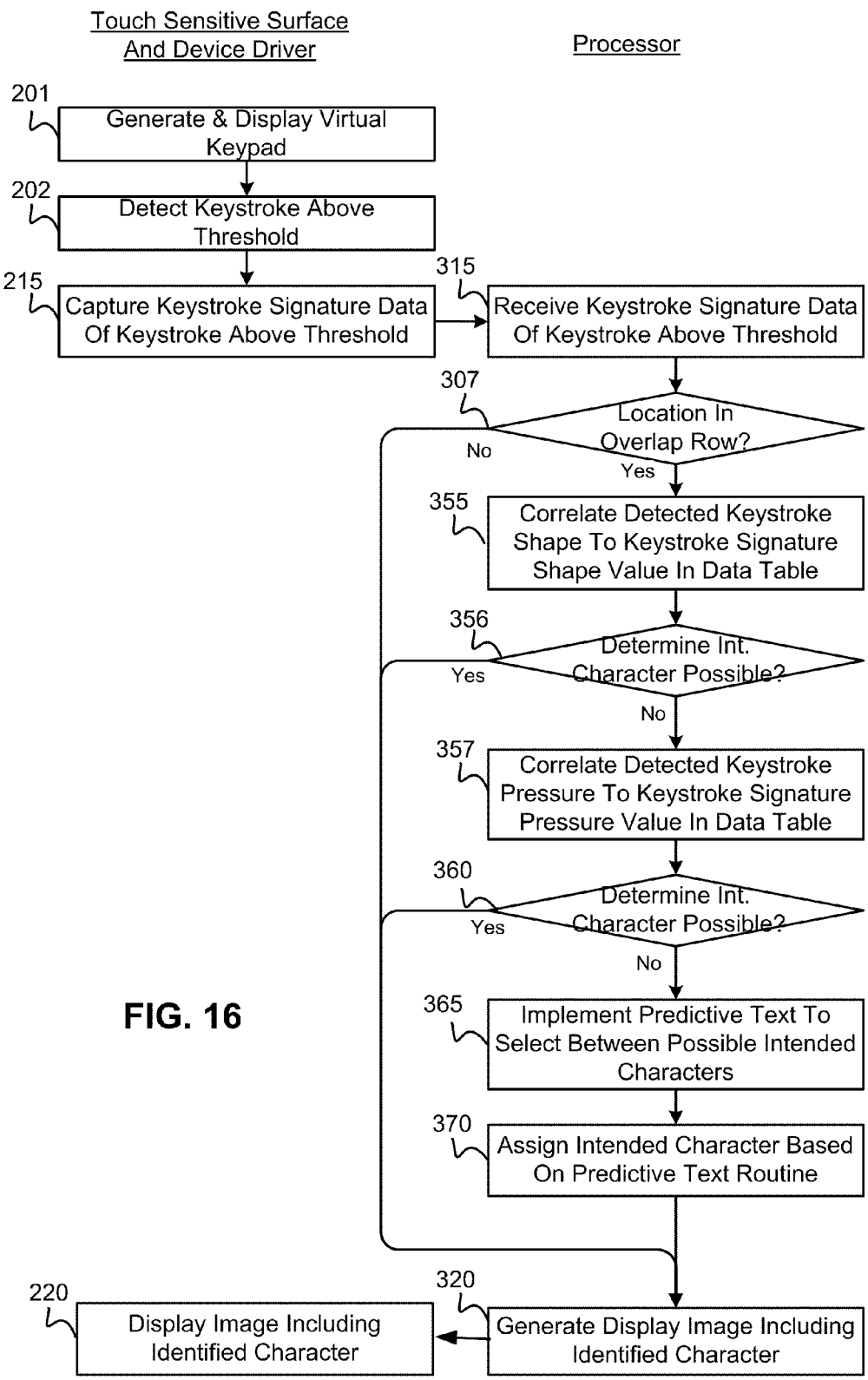
FIG. 16 is a process flow diagram illustrating another embodiment method for disambiguating a keystroke in an overlap region.

In instances where the processor is not able to disambiguate a keystroke by comparing its signature data to stored keystroke signature data, the processor may apply a predictive text routine to determine a most likely intended keystroke. FIG. 16 is a process flow diagram illustrating such an alternative embodiment method. The process flow illustrated in FIG. 16 is similar to the process flow described above with reference to FIG. 15 so the foregoing descriptions of like number steps apply as well. After attempting to disambiguate the keystroke by comparing measured keystroke pressure to the keystroke signature pressure data stored in the keystroke signature data table, the processor may determine if it was able to disambiguate the keystroke, determination 360. If the processor is able to disambiguate the keystroke based on touch shape and pressure data (i.e., determination 360=Yes), the processor accepts the identified character as an input, generates the display image including the identified character, step 320, and communicates display to the pressure sensing touch screen to display the image, step 220. However, if the processor is still unable to disambiguate the keystroke (i.e. determination 360=No), the processor may implement any of a number of well known predictive text routines to select between two (or more) overlapping keys the character of which best matches the rest of the previously entered text, step 365. The predicted character is then assigned as the input character associated with the detected keystroke, step 270. The processor may then generate the display image including the identified character, step 320, and communicate this information to the pressure sensing touch screen to display the image, step 220.

Figure 17:
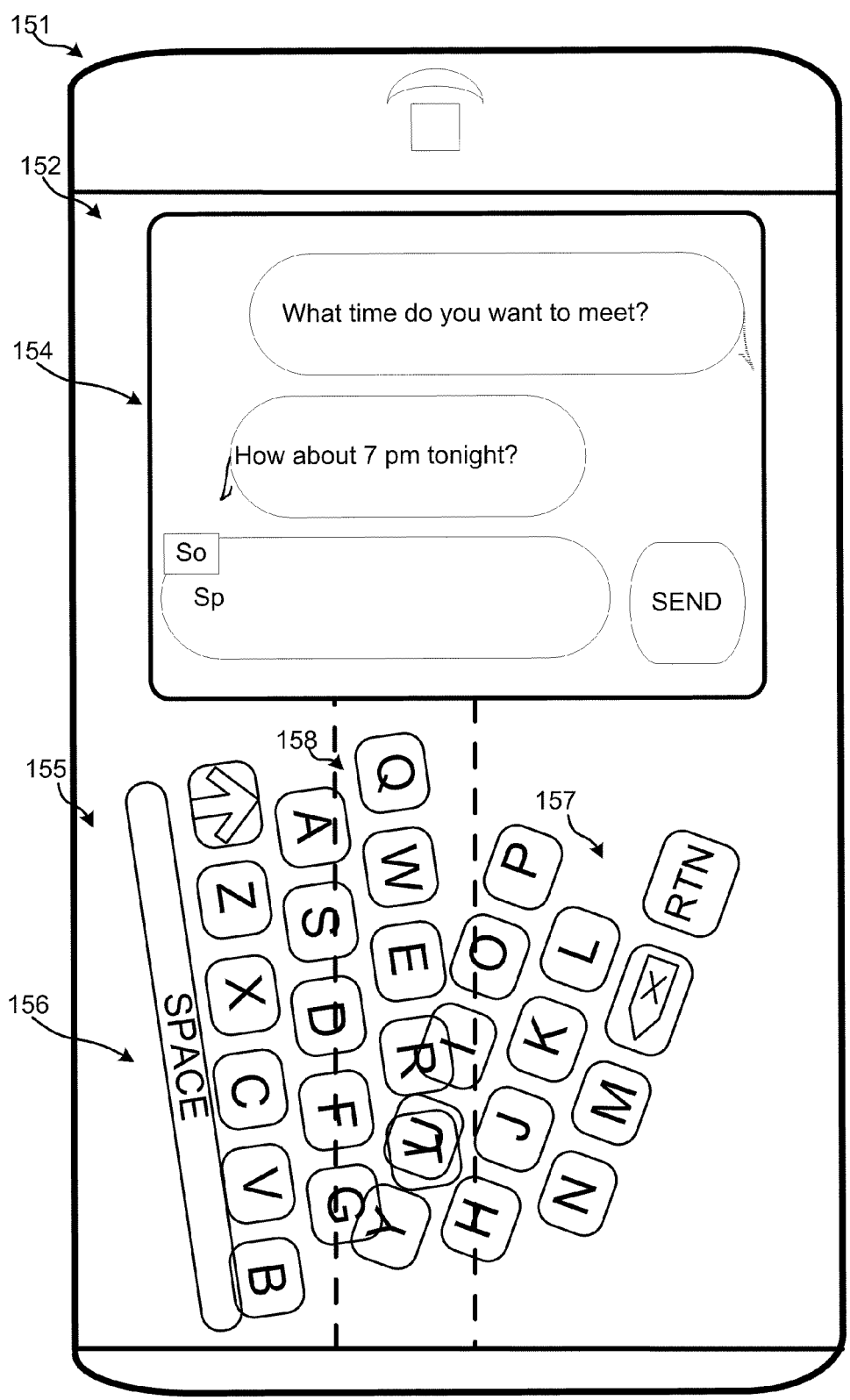
FIG. 17 is an illustration of an alternative embodiment virtual keypad layout.

FIG. 17 illustrates another embodiment virtual keypad layout displayed on a mobile device 151. The virtual keypad layout shown in FIG. 17 is similar to the embodiment virtual keypad layout illustrated in FIG. 7, except that the angle between the left hand portion 156 and right hand portion 157 has been increased. Such a layout more closely resembles the commercially available ergonomic "natural style keyboard" layouts and may be more comfortable for some users. By implementing the alternative virtual keypad layout shown in FIG. 17, the user may experience a more comfortable data entry position as the increased angle may more closely resemble the user's natural hand pronation angle. The angle between left hand portion 156 and right hand portion 157 may be modified by the user to achieve a more comfortable hand position and/or to minimize the number of keys overlapping one another on the touch screen surface display. As a result of the angle between the left hand portion 156 and the right hand portion 157, fewer keys overlap one another. For example, in the embodiment layout illustrated in FIG. 7, eight keys are located within the overlap region 158 such that four sets of two keys are located at substantially the same coordinates of the touch screen surface. In contrast, in the alternative embodiment layout illustrated in FIG. 17, only six keys overlap. Specifically, the "R" key overlaps the "T" key; the "T" key overlaps the "U" key; and the "G" key overlaps at least a portion of the "Y" key. Any of the embodiment methods described with reference to FIGS. 8-16 may be used in conjunction with the virtual keypad layout illustrated in FIG. 17 in order to disambiguate any keystrokes on overlapping keys.

In a further embodiment, the ability to measure pressure applied to a pressure sensing touch screen may enable streamlined user interface designs. For example, an address book or contact database may contain contact information regarding a user's family, friends, business acquaintances, etc. In many cases, each contact may include multiple contact phone numbers (e.g., mobile device, home, business, fax, etc.), as well as email addresses, SMS addresses, etc. In most address book applications a user may have to execute a series of keystrokes and/or pull down menu selections in order to select a contact function (such as placing a telephone, typing an email, sending a fax, typing an SMS, sending a MMS, etc.) to use to communicate with a contact name. Even if a particular contact only has a single contact number or email address, etc., the user typically has to first select the contact name and then select which contact number/address to use for communicating with the contact. By implementing a pressure sensing touch screen on a mobile device, an embodiment user interface may be provided which allows users to select both a contact and a desired contact function/address/number in a single keystroke.

Figure 18:
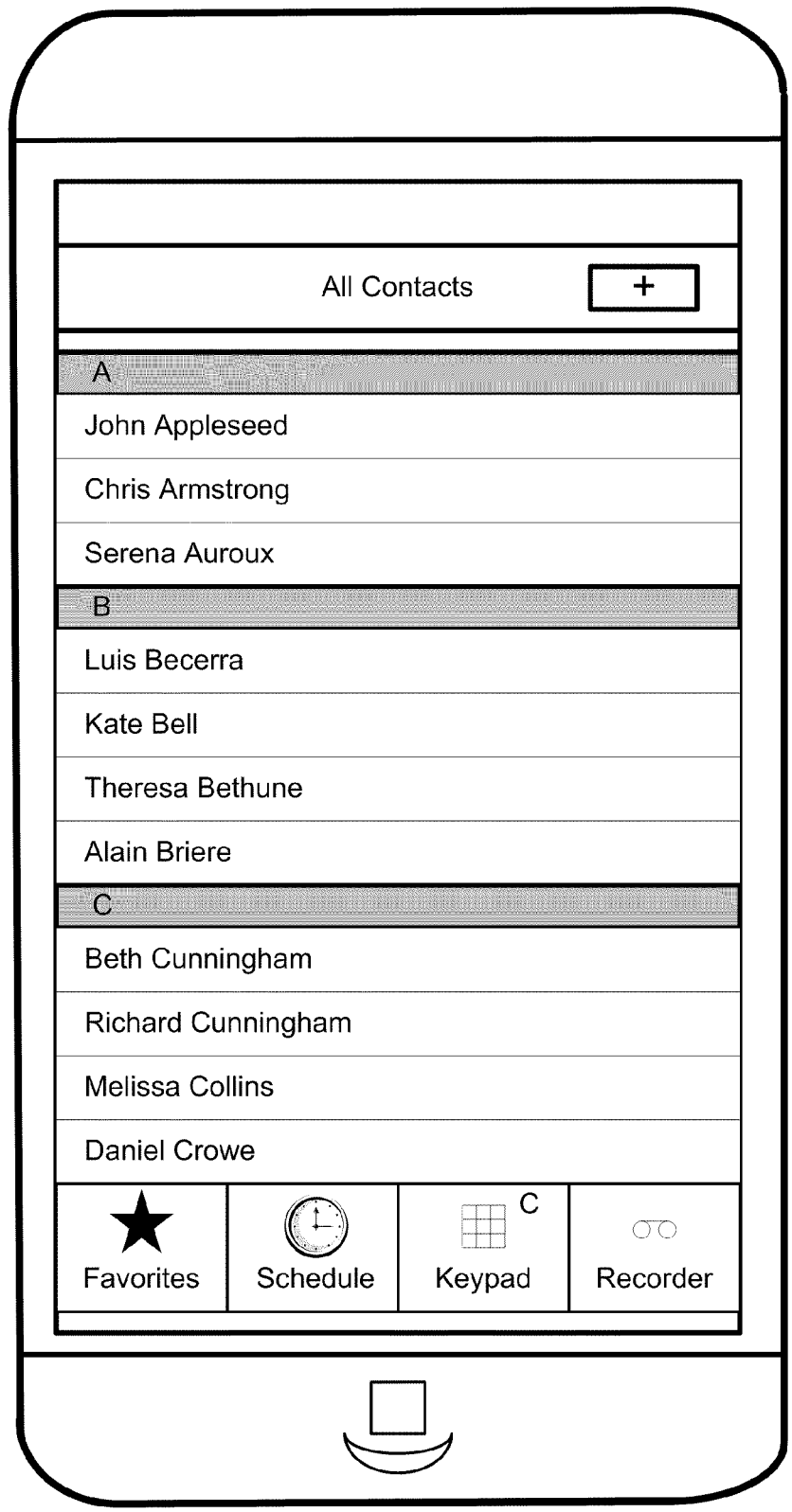
FIG. 18 is an illustration of an exemplary contacts application top menu display.

FIG. 18 illustrates an exemplary top menu display for an address book application. In this embodiment, applied pressure is measured and the data used to select a different element or function. Each contact within the address book database may be assigned a number of pressure "speed dials." The number of pressure speed dials may vary according to the sensitivity of the pressure sensor (i.e., the precision with which the pressure sensor is able to distinguish between varying levels of applied pressure) as well as the user's ability to control the amount of pressure exerted on the touch screen display surface. By pressing on a selected contact name with varying degrees of pressure, a user may select not only the contact name but also the contact function that the user wishes to use to communicate with the selected contact. For example, a mobile device address book application may allow users to assign up to four pressure speed dials per contact name. By pressing on the contact name lightly, the user may initiate a telephone call to the contact name's mobile device. By pressing on the contact name slightly harder, the user may initiate an email message to the contact name's primary email address. By pressing on the contact name harder still, the user may initiate an SMS text message to the contact name's mobile device. Finally, by pressing on the contact name very hard, the user may initiate a telephone call to the contact name's work telephone. These contact functions are merely meant to be illustrative of the embodiment. In practice users may customize the contact functions and their correlation to exerted pressure levels.

Figure 19:
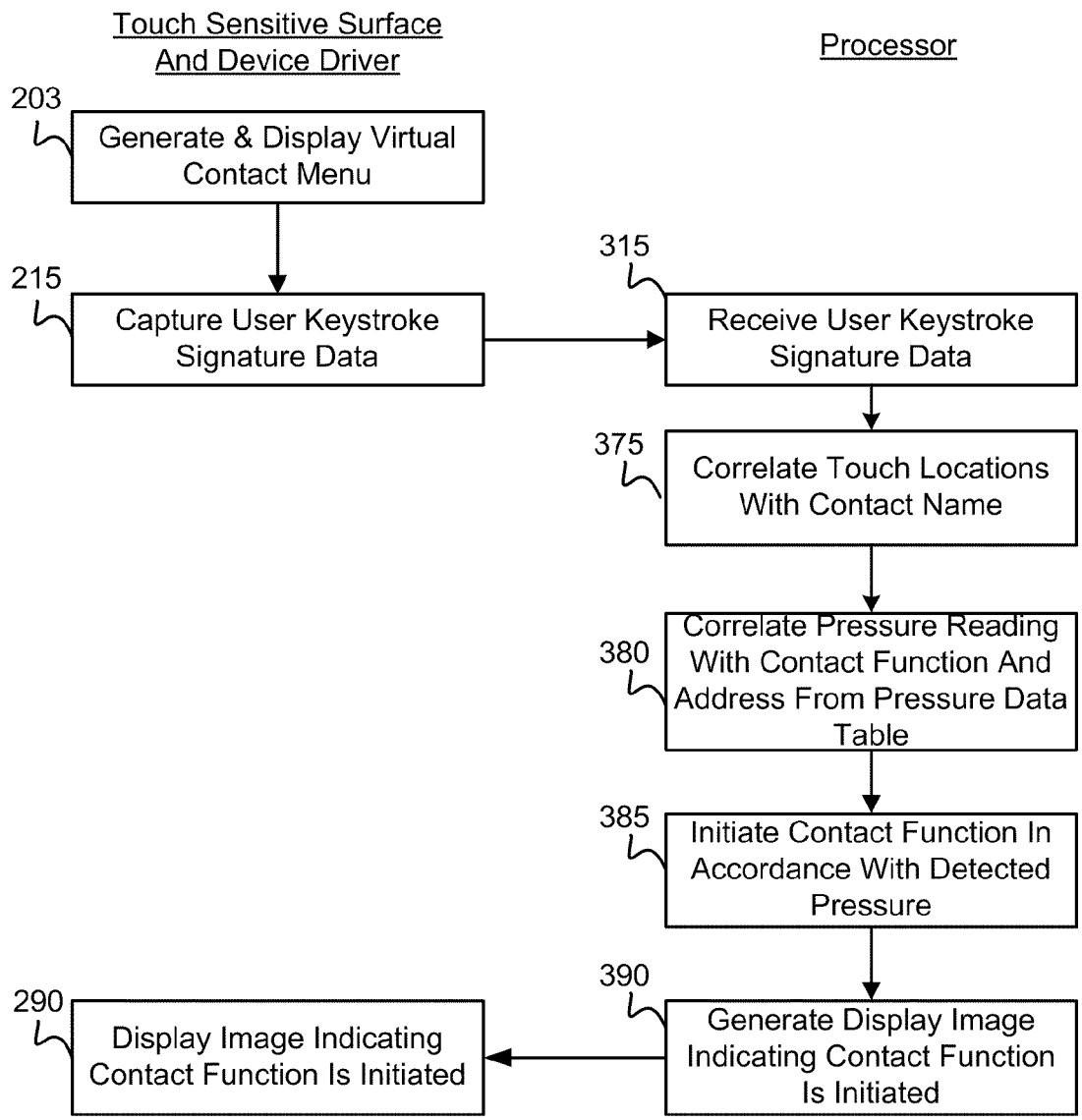
FIG. 19 is a process flow diagram illustrating an embodiment method for initiating a contact function based upon a measured pressure of a single keystroke.

Once the pressure speed dial settings have been established and stored in a pressure speed dial data table, the mobile device may implement an embodiment method, such as illustrated in FIG. 19, which allows a user to select both the contact name and contact function in a single keystroke. Similar to generating and displaying a virtual keypad layout, the touch sensitive surface and device driver may generate and display a contact application top menu, step 203. When a user touches a contact name, the touch sensitive surface and device driver may capture keystroke signature data associated with the touch, step 215. As described earlier, the detected keystroke signature data may include information regarding the keystroke location, shape, and/or pressure. The detected keystroke signature data may be communicated to the mobile device processor, step 315. The mobile device processor may correlate the detected keystroke location with a particular contact record, step 375. The mobile device processor may then compare the detected keystroke pressure data to pressure data stored in the pressure speed dial data table to determine a corresponding contact function, step 380. An example of a pressure speed dial data table is illustrated in FIG. 22. Once corresponding contact function is identified, the processor may initiate the contact function for the selected contact, step 385. The processor may also generate a display image indicating that the contact function has been initiated, step 390. The display image may be communicated to the pressure sensing touch screen for display, step 290.

FIG. 22 is an exemplary pressure speed dial data table. As shown in FIG. 22, various contact functions may be initiated in response to measuring the pressure exerted on a contact name. For example, if a user exerts between 1 Newton and 10 Newtons of force upon the touch screen, the keystroke pressure may be correlated to a voice call function. Therefore, when such a pressure is measured, the processor may initiate a voice call to the primary telephone number listed in the detailed contact information for the contact name that was touched. Similarly, if a user exerts between 10 Newtons and 20 Newtons of force upon the touch screen, the keystroke pressure may be correlated to an email function. Therefore, when such a pressure is measured, the processor may initiate an email to the primary email address listed in the detailed contact information for the contact name that was touched. In addition, if a user exerts between 20 Newtons and 30 Newtons of force upon the touch screen, the keystroke pressure may be correlated to a SMS function. Therefore, when such a pressure is measured, the processor may initiate a SMS message to the mobile device telephone number listed in the detailed contact information for the contact name that was touched.

Also, if a user exerts more than 30 Newtons of force upon the touch screen, the keystroke pressure may be correlated to a telephone call to a secondary telephone number. Therefore, when such a pressure is measured, the processor may initiate a telephone call to a secondary telephone number listed in the detailed contact information for the contact name that was touched. In this manner, a user may make a single keystroke, namely a touch to a desired contact name, with varying degrees of pressure to initiate a variety of contact functions for the selected contact.

The pressure speed dial data table shown in FIG. 22 is meant to be illustrative only. Variations of the pressure speed dial data table may be implemented. For example, some pressure speed dial data tables may include more or fewer contact function options. Some pressure sensors may not be able to precisely distinguish varying levels of pressure. As a result fewer contact function options may be provided. Alternatively, users may have a hard time exerting pressure on the touch screen with a high degree of repeatability. Accordingly, some users may wish to have fewer pressure-activated contact function options so that the user may simply press hard or soft to distinguish between contact function options. In other alternative embodiments, a separate pressure speed dial data table may be maintained for each contact. Each pressure speed dial data table may be customized to initiate a different contact function for different levels of pressure. Thus, for example, while exerting between 1 and 10 Newtons of force on a first contact will result in a telephone call to the contact name's mobile device, exerting the same amount of force on a second contact may result in a SMS message addressed to the second contact name's mobile device.

In another embodiment, pressure sensors in the pressure sensing touch screen may be exploited to provide the user with an intuitive volume control user interface. While some mobile devices provide users with a speaker function, there may be instances where the user wishes to keep the audio output of the speaker private. For example, when conducting a telephone call in public, the user may wish to forego the speakerphone functionality so that others cannot eavesdrop. In such instances, the user typically holds the speaker of the mobile device to the user's ear. When the user cannot hear the audio output clearly, the natural instinct of the user is to press the mobile device harder against the user's ear. In an embodiment, the mobile device may detect this pressure exerted against the pressure sensing touch screen by the user's ear and/or face and, in response, increase the volume output of the speaker.

Figure 20:
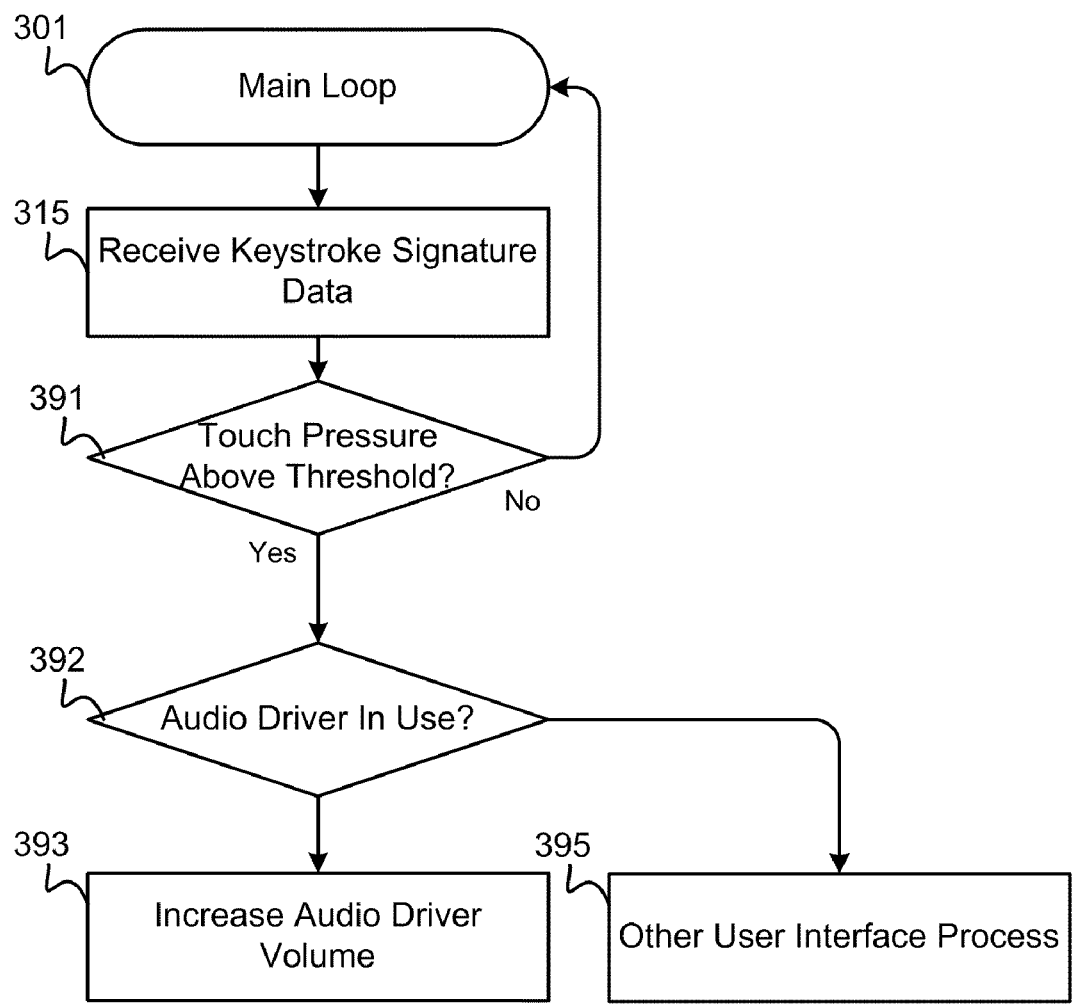
FIG. 20 is a process flow diagram illustrating an embodiment method for controlling audio volume output.

FIG. 20 is a process flow diagram illustrating such an embodiment method. A mobile device processor may execute a main loop 301 which controls and monitors the activity of several applications and activities. During the execution of the main loop 301, the processor may receive an interrupt from the pressure sensing touch screen that pressure is being exerted on the pressure sensing touch screen including the keystroke signature data (e.g., touch location, shape, pressure, etc.), step 315. The processor (or pressure sensing touch screen) may determine if the touch pressure is above a threshold in order to confirm that the touch is an intentional press on the pressure sensing touch screen and not merely an incidental touch, determination 391. If the touch pressure is not above a threshold (i.e., determination 391=No), then the touch may be deemed incidental and the processor returns to the main loop 301. If the touch pressure is above the threshold (i.e., determination 391=Yes), the processor determines if the audio driver is in use, determination 392. If the audio driver is not in use (i.e., determination 392=No), then the touch may be intended for some other user interface process, step 395.

However, if the processor determines that the audio driver is in use (i.e., determination 392=Yes), the processor may increase the volume setting of the audio driver, step 393.

In another embodiment, pressure sensors in the pressure sensing touch screen may be exploited to provide the user with an intuitive zoom-in/zoom-out image control user interface. Recent user interface developments have provided users with a pinch gesture that allows users to zoom-out by placing two fingers on a touch screen display surface (typically a thumb-index finger combination) spaced some distance apart and moving the fingers in a pinching motion together. The touch screen display effectively zooms-out by recalibrating the scale of the display. For example, suppose a map were displayed on the touch screen surface and the scale of the map indicated that an inch represented a mile. By placing two fingers an inch apart and pinching them together such that the two fingers were now only half an inch apart, the scale of the displayed map would be effectively doubled so that one inch now represented two miles. Similarly, a user could zoom-in by placing two fingers together on the touch screen display surface and subsequently moving the fingers apart. The scale of the map would be decreased such that the same distance on the map would now represent less distance in real space. The problem with the conventional pinch gesture is that the amount of zoom is limited by 1) the size of the touch screen display and 2) the amount of distance users can spread their fingers. In many cases, users simply perform the pinch gesture repetitively until the desired amount of zoom is achieved.

In an embodiment method, the amount of zoom achieved in a two-finger pinch gesture may be controlled by the amount of pressure the user exerts on the touch pressure sensing touch screen. By performing the same pinch gesture with varying degrees of pressure a user can both initiate a zoom in or zoom out function with varying amounts of zoom power (magnification power).

Figure 21:
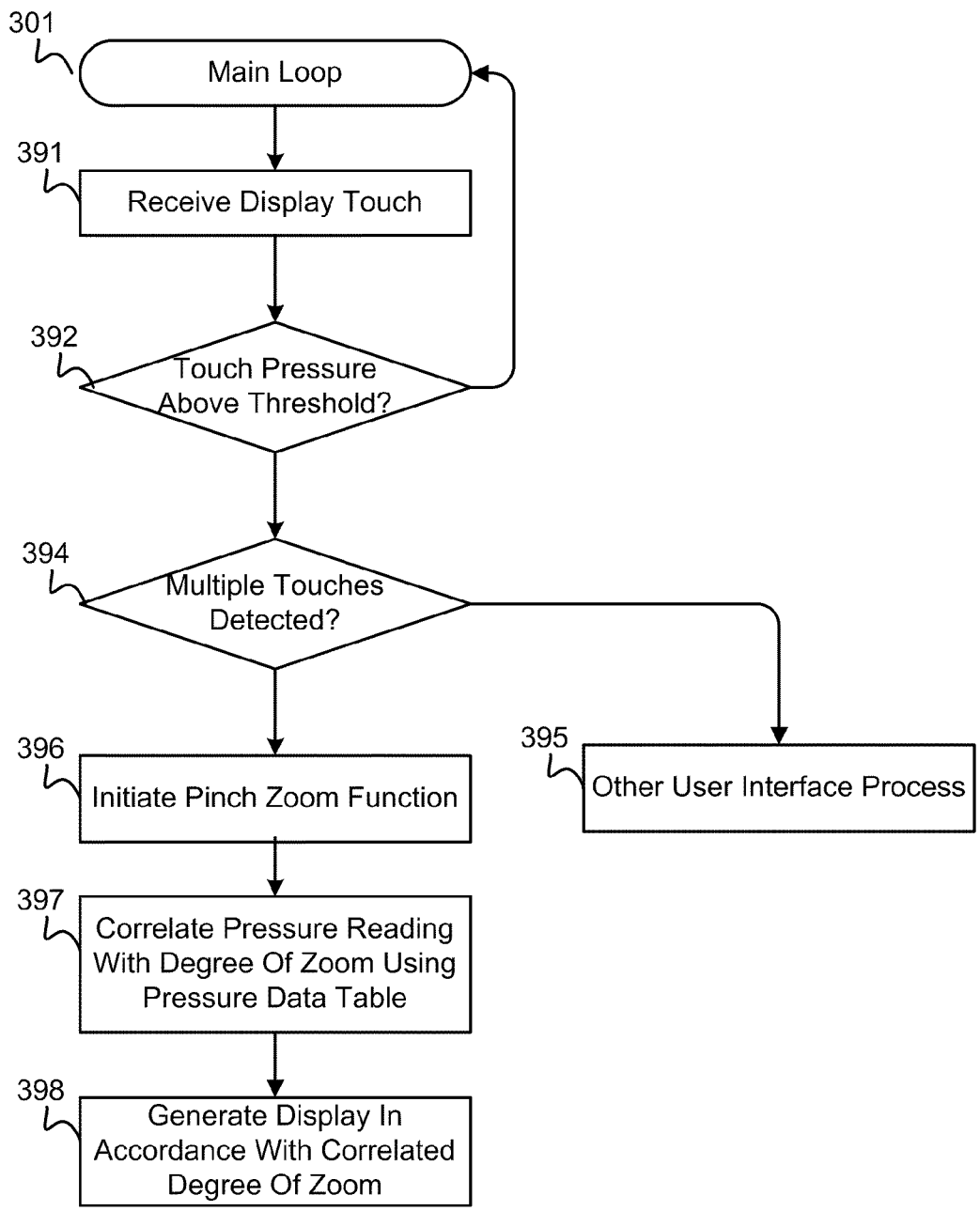
FIG. 21 is a process flow diagram illustrating an embodiment method for controlling a display magnification in a pinch gesture based on a measure amount of pressure exerted on a touch screen surface.

FIG. 21 is a process flow diagram illustrating such an embodiment method. Similar to the process flow described above with reference to FIG. 20, the processor may execute a main loop 301. During the execution of the main loop 301, the processor may receive an indication that a keystroke was made along with the keystroke signature data, step 315. The processor (or pressure sensing touch screen) may determine if the touch pressure is above a threshold in order to confirm that the touch is an intentional press on the pressure sensing touch screen and not merely an incidental touch, determination 391. If the touch pressure is not above a threshold (i.e., determination 391=No), then the touch may be deemed incidental and the processor returns to the main loop 301. If the touch pressure is above the threshold (i.e., determination 391=Yes), the processor determines if multiple touch locations resulting from two fingers touching the pressure sensing touch screen have been detected, determination 394. If only a single touch location is detected (i.e., determination 394=No), then the touch may be intended for some other user interface process, step 395. However, if the processor determines that multiple touches have been detected (i.e., determination 394=Yes), the processor may initiate the pinch zooming function, step 396. The pinch zooming function initiated in step 230 may determine whether to zoom-in or zoom-out depending on the movement of the fingers in the pinch gesture. The processor may further compared the measured pressure applied in the pinch gesture to a pressure zoom data table to determine a magnification factor to apply in the zoom in/out function, step 397. An example of a pressure zoom data table is shown in and described in more detail below with reference to FIG. 23. Once the zoom in or zoom out function is determined by the processor (step 396) and the zoom magnification factor is determined by correlating the detected amount of pressure associated with the keystroke (step 397), the processor may generate the appropriate display in accordance with the correlated degree of zoom in or zoom out, step 398.

FIG. 23 is an exemplary pressure zoom data table. As shown in FIG. 23, various levels of zoom may be applied to a zoom in or zoom out function when varying levels of pressure are exerted on a pressure sensing touch screen by the user's two fingers. For example, if a user exerts between 1 Newton and 10 Newtons of force upon the touch screen, the touch pressure will be correlated to 1.5× of zoom (magnification). If a user exerts between 10 Newton and 20 Newtons of force upon the touch screen, the touch pressure will be correlated to 2× of zoom (magnification). If a user exerts between 20 Newton and 30 Newtons of force upon the touch screen, the touch pressure will be correlated to 5× of zoom (magnification). If a user exerts between 1 Newton and 10 Newtons of force upon the touch screen, the touch pressure will be correlated to 10× of zoom (magnification).

The pressure zoom data table shown in FIG. 23 is meant to be illustrative only. Variations of the pressure zoom dial data table may be implemented. For example, some pressure zoom data tables may include more or fewer levels of magnification. Some pressure sensors may not be able to precisely distinguish varying levels of pressure. As a result fewer magnification level options may be presented. Alternatively, users may have a hard time exerting the varying degrees of pressure on the touch screen in a repeatable manner. Accordingly, some users may wish to have fewer magnification level options so that the user may simply press hard or soft to distinguish magnification level options.

As previously described, a user may interact with a virtual keypad on a pressure sensing touch screen using a variety of m devices, including mobile devices. Typical mobile devices suitable for use with the various aspects will have in common the components illustrated in FIG. 24. For example, an exemplary mobile device 1300 may include a processor 1301 coupled to internal memory 1302 and a pressure sensing touch screen 1303. Additionally, the mobile device 1300 may have an antenna 1304 for sending and receiving electromagnetic radiation that is connected to a wireless data link and/or cellular telephone transceiver 1305 coupled to the processor 1301. In some implementations, the transceiver 1305 and portions of the processor 1301 and memory 1302 used for cellular telephone communications are collectively referred to as the air interface since it provides a data interface via a wireless data link. Mobile devices 1300 may also include a physical key pad 1306 or miniature keyboard and menu selection buttons or rocker switches 1307 for receiving user inputs. The processor 1301 may further be connected to a vocoder 1399 which is in turn connected to a microphone 1319 and speaker 1318.

The mobile processor 1301 may be any programmable microprocessor, microcomputer or multiple processor chip or chips that can be configured by software instructions (applications) to perform a variety of functions, including the functions of the various aspects described herein. In some mobile devices, multiple processors 1301 may be provided, such as one processor dedicated to wireless communication functions and one processor dedicated to running other applications. Typically, software applications may be stored in the internal memory 1302 before they are accessed and loaded into the processor 1301. In some mobile devices, additional memory chips (e.g., a Secure Data (SD) card) may be plugged into the device 1300 and coupled to the processor 1301. In many mobile devices, the internal memory 1302 may be a volatile or nonvolatile memory, such as flash memory, or a mixture of both. For the purposes of this description, a general reference to memory refers to all memory accessible by the processor 1301, including internal memory 1302, removable memory plugged into the mobile device, and memory within the processor 1301 itself.

The foregoing method descriptions and process flow diagrams are provided merely as illustrative examples and are not intended to require or imply that the steps of the various aspects must be performed in the order presented. As will be appreciated by one of skill in the art the order of steps in the foregoing aspects may be performed in any order. Further, references to step identifiers and words such as "thereafter," "then," "next," etc. are not intended to limit the order of the steps; such identifiers and words are simply used to guide the reader through the description of the methods.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a computer-readable medium. The steps of a method or algorithm disclosed herein may be embodied in a processor-executable software module executed which may reside on a computer-readable medium. Computer-readable media includes computer storage media including any medium that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for disambiguating a keystroke on a virtual keypad, comprising:
    determining baseline touch positions for each of a plurality of fingertips resting on a touch screen displaying the virtual keypad;
    detecting the keystroke on the touch screen displaying the virtual keypad;
    determining whether the detected keystroke occurred in an overlap region;
    determining current locations for all touches on the touch screen if the detected keystroke occurred in the overlap region;
    determining which of the plurality of fingertips has deviated from its baseline touch position; and
    disambiguating the keystroke based upon the detected keystroke location and the determined touch that has deviated from the baseline touch position.

2. A method for disambiguating a keystroke on a virtual keypad, comprising:
    detecting the keystroke on a touch screen displaying the virtual keypad;
    determining whether the detected keystroke occurs in an overlap region;
    determining a touch shape of the detected keystroke in the overlap region;
    determining an orientation of the touch shape of the detected keystroke in the overlap region;
    determining which hand executed the detected keystroke based upon the determined orientation of the detected keystroke touch shape; and
    assigning a character to the detected keystroke in the overlap region based upon the detected keystroke location and which hand executed the detected keystroke.

3. A method for disambiguating a keystroke on a virtual keypad, comprising:
    detecting the keystroke on a touch screen displaying the virtual keypad;
    determining whether the detected keystroke occurs in an overlap region;
    determining a touch shape of the detected keystroke in the overlap region;
    comparing the shape of the detected keystroke in the overlap region to stored keystroke signature data to determine a matching touch shape; and
    assigning to the detected keystroke in the overlap region a character corresponding to the matched touch shape.

4. The method of claim 3, wherein disambiguating the keystroke based upon the touch shape comprises:
    measuring a pressure applied to the touch screen by the detected keystroke;
    comparing the measured pressure of the detected keystroke in the overlap region to stored keystroke signature data to determine a matching pressure signature; and
    assigning to the detected keystroke in the overlap region a character corresponding to the matched pressure signature.

5. The method of claim 4, wherein disambiguating the keystroke based upon the touch shape comprises:
    determining whether the keystroke can be disambiguated based upon comparisons of keystroke touch shape and measured pressure to keystroke signature data for the intended key value;
    executing a predictive text routine to select between possible intended key values if the keystroke cannot be disambiguated based on keystroke touch shape and measured pressure; and
    assigning to the detected keystroke in the overlap region a character identified by the predictive text routine.

6. A mobile device having a virtual keypad, comprising:
    means for determining baseline touch position for each of a plurality of fingertips resting on a touch screen displaying the virtual keypad;
    means for detecting the keystroke on the pressure sensing touch screen displaying the virtual keypad;
    means for determining whether the detected keystroke occurred in an overlap region;
    means for determining current locations for all touches on the touch screen if the detected keystroke occurred in the overlap region;
    means for determining which of the plurality of fingertips has deviated from its baseline touch position; and
    means for disambiguating the keystroke based upon the detected keystroke location and the determined touch that has deviated from the baseline touch position.

7. A mobile device having a virtual keypad, comprising:
    means for detecting a keystroke on a touch screen displaying the virtual keypad;
    means for determining whether the detected keystroke occurred in an overlap region;
    means for determining a touch shape of the detected keystroke in the overlap region;
    means for determining an orientation of the touch shape of the detected keystroke in the overlap region;
    means for determining which hand executed the detected keystroke based upon the determined orientation of the detected keystroke touch shape; and
    means for assigning a character to the detected keystroke in the overlap region based upon the detected keystroke location and which hand executed the detected keystroke.

8. A mobile device having a virtual keypad, comprising:
    means for detecting a keystroke on a touch screen displaying the virtual keypad;
    means for determining whether the detected keystroke occurred in an overlap region;
    means for determining a touch shape of the detected keystroke in the overlap region;
    means for comparing the shape of the detected keystroke in the overlap region to stored keystroke signature data to determine a matching touch shape; and
    means for assigning to the detected keystroke in the overlap region a character corresponding to the matched touch shape.

9. The mobile device of claim 8, wherein the means for disambiguating the keystroke based upon the touch shape comprises:
 means for measuring a pressure applied to the touch screen by the detected keystroke;
 means for comparing the measured pressure of the detected keystroke in the overlap region to stored keystroke signature data to determine a matching pressure signature; and
 means for assigning to the detected keystroke in the overlap region a character corresponding to the matched pressure signature.

10. The mobile device of claim 9, wherein the means for disambiguating the keystroke based upon the touch shape comprises:
 means for determining whether the keystroke can be disambiguated based upon comparisons of keystroke touch shape and measured pressure to keystroke signature data for an intended key value;
 means for executing a predictive text routine to select between possible intended key values if the keystroke cannot be disambiguated based on keystroke touch shape and measured pressure; and
 means for assigning to the detected keystroke in the overlap region a character identified by the predictive text routine.

11. A mobile device, comprising:
 a touch screen display;
 a memory unit; and
 a processor coupled to the memory unit and the touch screen display, wherein the processor is configured with software instructions to perform operations comprising:
  determining baseline touch locations for each of a plurality of fingertips resting on a touch screen displaying the virtual keypad;
  detecting the keystroke on the touch screen displaying the virtual keypad;
  determining whether the detected keystroke occurred in an overlap region;
  determining current locations for all touches on the touch screen if the detected keystroke occurred in the overlap region;
  determining which of the plurality of fingertips has deviated from its baseline touch position; and
  disambiguating the keystroke based upon the detected keystroke location and the determined touch that has deviated from the baseline touch position.

12. A mobile device, comprising:
 a touch screen display;
 a memory unit; and
 a processor coupled to the memory unit and the touch screen display, wherein the processor is configured with software instructions to perform operations comprising:
  detecting the keystroke on a touch screen displaying the virtual keypad;
  determining whether the detected keystroke occurs in an overlap region;
  determining a touch shape of the detected keystroke in the overlap region;
  determining an orientation of the touch shape of the detected keystroke in the overlap region;
  determining which hand executed the detected keystroke based upon the determined orientation of the detected keystroke touch shape; and
  assigning a character to the detected keystroke in the overlap region based upon the detected keystroke location and which hand executed the detected keystroke.

13. A mobile device, comprising:
 a touch screen display;
 a memory unit; and
 a processor coupled to the memory unit and the touch screen display, wherein the processor is configured with software instructions to perform operations comprising:
  detecting the keystroke on a touch screen displaying the virtual keypad;
  determining whether the detected keystroke occurs in an overlap region;
  determining a touch shape of the detected keystroke in the overlap region;
  comparing the shape of the detected keystroke in the overlap region to stored keystroke signature data to determine a matching touch shape; and
  assigning to the detected keystroke in the overlap region a character corresponding to the matched touch shape.

14. The mobile device of claim 13, wherein the processor is configured with software instructions to perform further operations comprising:
 measuring a pressure applied to the touch screen by the detected keystroke;
 comparing the measured pressure of the detected keystroke in the overlap region to stored keystroke signature data to determine a matching pressure signature; and
 assigning to the detected keystroke in the overlap region a character corresponding to the matched pressure signature.

15. The mobile device of claim 14, wherein the processor is configured with software instructions to perform further operations comprising:
 determining whether the keystroke can be disambiguated based upon comparisons of keystroke touch shape and measured pressure to keystroke signature data for an intended key value;
 executing a predictive text routine to select between possible intended key values if the keystroke cannot be disambiguated based on keystroke touch shape and measured pressure; and
 assigning to the detected keystroke in the overlap region a character identified by the predictive text routine.

16. A tangible non-transitory storage medium having stored thereon processor-executable software instructions configured to cause a processor to perform operations comprising:
 determining baseline touch position for each of a plurality of fingertips resting on a touch screen displaying the virtual keypad;
 detecting the keystroke on the touch screen displaying the virtual keypad;
 determining whether the detected keystroke occurred in an overlap region;
 determining current locations for all touches on the touch screen if the detected keystroke occurred in the overlap region;
 determining which of the plurality of fingertips has deviated from its baseline touch position; and
 disambiguating the keystroke based upon the detected keystroke location and the determined touch that has deviated from the baseline touch position.

17. A tangible non-transitory storage medium having stored thereon processor-executable software instructions configured to cause a processor to perform operations comprising:
- detecting a keystroke on a touch screen displaying a virtual keypad;
- determining whether the detected keystroke occurred in an overlap region;
- determining a touch shape of the detected keystroke in the overlap region;
- disambiguating the keystroke based upon the touch shape;
- determining an orientation of the touch shape of the detected keystroke in the overlap region;
- determining which hand executed the detected keystroke based upon the determined orientation of the detected keystroke touch shape; and
- assigning a character to the detected keystroke in the overlap region based upon the detected keystroke location and which hand executed the detected keystroke.

18. A tangible non-transitory storage medium having stored thereon processor-executable software instructions configured to cause a processor to perform operations comprising:
- detecting a keystroke on a touch screen displaying a virtual keypad;
- determining whether the detected keystroke occurred in an overlap region;
- determining a touch shape of the detected keystroke in the overlap region;
- disambiguating the keystroke based upon the touch shape;
- comparing the shape of the detected keystroke in the overlap region to stored keystroke signature data to determine a matching touch shape; and
- assigning to the detected keystroke in the overlap region a character corresponding to the matched touch shape.

19. The tangible non-transitory storage medium of claim 18, wherein the tangible non-transitory storage medium has processor-executable software instructions configured to cause a processor to perform further operations comprising:
- measuring a pressure applied to the touch screen by the detected keystroke;
- comparing the measured pressure of the detected keystroke in the overlap region to stored keystroke signature data to determine a matching pressure signature; and
- assigning to the detected keystroke in the overlap region a character corresponding to the matched pressure signature.

20. The tangible non-transitory storage medium of claim 19, wherein the tangible non-transitory storage medium has processor-executable software instructions configured to cause a processor to perform further operations comprising:
- determining whether the keystroke can be disambiguated based upon comparisons of keystroke touch shape and measured pressure to keystroke signature data for the intended key value;
- executing a predictive text routine to select between possible intended key values if the keystroke cannot be disambiguated based on keystroke touch shape and measured pressure; and
- assigning to the detected keystroke in the overlap region a character identified by the predictive text routine.

* * * * *